(12) United States Patent
Suzuki et al.

(10) Patent No.: US 11,816,294 B2
(45) Date of Patent: *Nov. 14, 2023

(54) IMAGE PROCESSING DEVICE, IMAGING DEVICE, METHOD OF CONTROLLING IMAGE PROCESSING DEVICE, AND RECORDING MEDIUM, WITH OUTPUTTING IMAGE IF ACCEPTING FIRST ACTION AND WITH OUTPUTTING DISTRIBUTION INFORMATION OF EVALUATION VALUES IF ACCEPTING SECOND ACTION

(71) Applicant: CANON KABUSHIKI KAISHA, Tokyo (JP)

(72) Inventors: Asahi Suzuki, Yokohama (JP); Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,595

(22) Filed: Apr. 20, 2022

(65) Prior Publication Data

US 2022/0244831 A1 Aug. 4, 2022

Related U.S. Application Data

(62) Division of application No. 16/890,312, filed on Jun. 2, 2020, now Pat. No. 11,327,606.

(30) Foreign Application Priority Data

Jun. 25, 2019 (JP) .................................. 2019-117755

(51) Int. Cl.
*G06F 3/041* (2006.01)
*G06F 3/04883* (2022.01)
(Continued)

(52) U.S. Cl.
CPC ........ *G06F 3/04186* (2019.05); *G06F 1/1686* (2013.01); *G06F 1/1694* (2013.01);
(Continued)

(58) Field of Classification Search
CPC .. G06F 3/04186; G06F 1/1686; G06F 1/1694; G06F 3/04883; G06F 3/04845;
(Continued)

(56) References Cited

U.S. PATENT DOCUMENTS 4,760,608 A 7/1988 Suzuki
4,855,765 A 8/1989 Suzuki et al.
(Continued)

FOREIGN PATENT DOCUMENTS

JP 2006-065349 A 3/2006
JP 2008-015754 A 1/2008
(Continued)

OTHER PUBLICATIONS

Mar. 20, 2023 Japanese Official Action in Japanese Patent Appln. No. 2019-117755.

*Primary Examiner* — Luong T Nguyen
(74) *Attorney, Agent, or Firm* — Venable LLP

(57) ABSTRACT

Provided are an output unit configured to output an image or distribution information of evaluation values corresponding to a plurality of regions of the image, an operation unit configured to accept a first action and a second action different from the first action; and a control unit configured to execute, when the output unit outputs a first image, output control such that the output unit outputs a second image if the operation unit accepts the first action, and that the output unit outputs distribution information of the evaluation values corresponding to the first image if the operation unit accepts the second action.

22 Claims, 17 Drawing Sheets

(51) Int. Cl.
*G06F 1/16* (2006.01)
*H04N 1/00* (2006.01)
*H04N 23/00* (2023.01)
*H04N 23/60* (2023.01)
*H04N 23/63* (2023.01)
*H04N 23/667* (2023.01)
*H04N 23/67* (2023.01)

(52) U.S. Cl.
CPC ....... *G06F 3/04883* (2013.01); *H04N 1/0044* (2013.01); *H04N 1/00411* (2013.01); *H04N 23/00* (2023.01); *H04N 23/60* (2023.01); *H04N 23/632* (2023.01); *H04N 23/667* (2023.01); *H04N 23/672* (2023.01)

(58) Field of Classification Search
CPC .......... G06F 2200/1614; G06F 3/0483; H04N 1/00411; H04N 1/0044; H04N 5/225; H04N 5/232; H04N 5/232122; H04N 5/23245; H04N 5/232935; H04N 5/23216; H04N 5/232939; H04N 23/632; H04N 23/667; H04N 23/672; H04N 23/62; H04N 23/633; H04N 23/00; H04N 23/60; H04N 25/704
See application file for complete search history.

(56) References Cited

U.S. PATENT DOCUMENTS

| | | |
|---|---|---|
| 5,003,326 A | 3/1991 | Suzuki et al. |
| 5,371,609 A | 12/1994 | Suzuki et al. |
| 5,414,531 A | 5/1995 | Amemiya et al. |
| 6,097,510 A | 8/2000 | Kanno et al. |
| 6,301,017 B1 | 10/2001 | Suzuki et al. |
| 7,324,151 B2 | 1/2008 | Onozawa |
| 8,434,879 B2 | 5/2013 | Nimura et al. |
| 9,131,157 B2* | 9/2015 | Misawa ................. H04N 5/235 |
| 10,440,251 B2 | 10/2019 | Ono et al. |
| 11,327,606 B2* | 5/2022 | Suzuki ................. G06F 1/1686 |
| 2011/0292303 A1* | 12/2011 | Nimura ............... H04N 9/3194 |
| | | 348/745 |
| 2015/0124131 A1 | 5/2015 | Misawa |
| 2018/0253641 A1 | 9/2018 | Yachide et al. |
| 2019/0387158 A1* | 12/2019 | Ono ................. H04N 5/232939 |
| 2019/0394409 A1* | 12/2019 | Matsumoto ............ G03B 13/30 |

FOREIGN PATENT DOCUMENTS

| | | |
|---|---|---|
| JP | 2011-040008 A | 2/2011 |
| JP | 2016-034135 A | 3/2016 |

\* cited by examiner

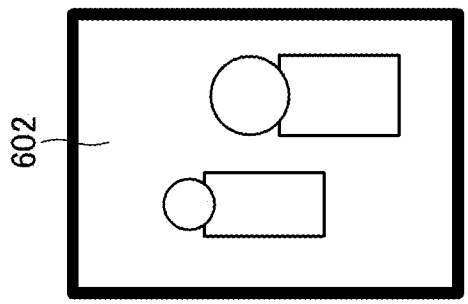
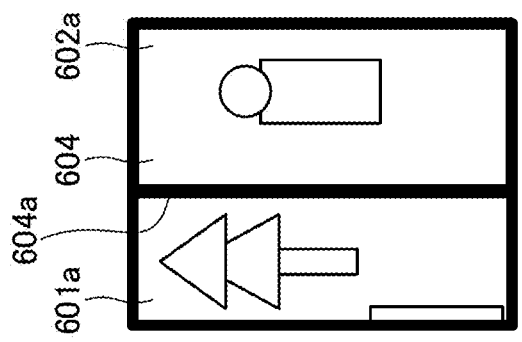

(A)

(B)

IMAGE PROCESSING DEVICE, IMAGING DEVICE, METHOD OF CONTROLLING IMAGE PROCESSING DEVICE, AND RECORDING MEDIUM, WITH OUTPUTTING IMAGE IF ACCEPTING FIRST ACTION AND WITH OUTPUTTING DISTRIBUTION INFORMATION OF EVALUATION VALUES IF ACCEPTING SECOND ACTION

This application is a divisional application of application Ser. No. 16/890,312 filed Jun. 2, 2020, U.S. Pat. No. 11,327,606 B2.

BACKGROUND OF THE INVENTION

Field of the Invention

The present invention relates to an image processing device, an imaging device, a method of controlling an image processing device, and a recording medium.

Description of the Related Art

Conventionally, as an example of an image processing device, an imaging device capable of image feeding on the basis of an operation from a user when a plurality of captured images stored in a memory within a device or a recording medium mounted in the device are reproduced is known. For example, in a smartphone or a digital camera, image feeding can be performed by horizontally swiping the display surface of a display. Japanese Patent Laid-Open No. 2011-40008 has disclosed a technique in which actions such as keeping or erasure of a displayed image can be performed through predetermined touch operations in addition to image feeding based on horizontal swiping during reproduction of a captured image.

However, in the related art disclosed in Japanese Patent Laid-Open No. 2011-40008, accepting an operation for displaying an evaluation value corresponding to each displayed image together with image feeding during reproduction and display of a captured image has not been taken into account.

SUMMARY OF THE INVENTION

The present invention can perform display of evaluation values of a displayed image together with image feeding during reproduction and display of a captured image.

An image processing device according to an embodiment of the present invention includes: an output unit configured to output an image or distribution information of evaluation values corresponding to a plurality of regions of the image; an operation unit configured to accept a first action and a second action different from the first action; and a control unit configured to execute, when the output unit outputs a first image, output control such that the output unit outputs a second image if the operation unit accepts the first action, and that the output unit outputs distribution information of the evaluation values corresponding to the first image if the operation unit accepts the second action.

Further features of the present invention will become apparent from the following description of exemplary embodiments with reference to the attached drawings.

BRIEF DESCRIPTION OF THE DRAWINGS

FIGS. 6A to 6C are diagrams illustrating an image feeding function in a vertical composition image.

DESCRIPTION OF THE EMBODIMENTS

Hereinafter, a preferred embodiment of the present invention will be described in detail with reference to the accompanying drawings. Meanwhile, an embodiment to be described below is an image processing device, and an example in which the present invention is applied to a digital camera (an imaging device) as an example of the image processing device will be described.

Example 1

Figure 1:
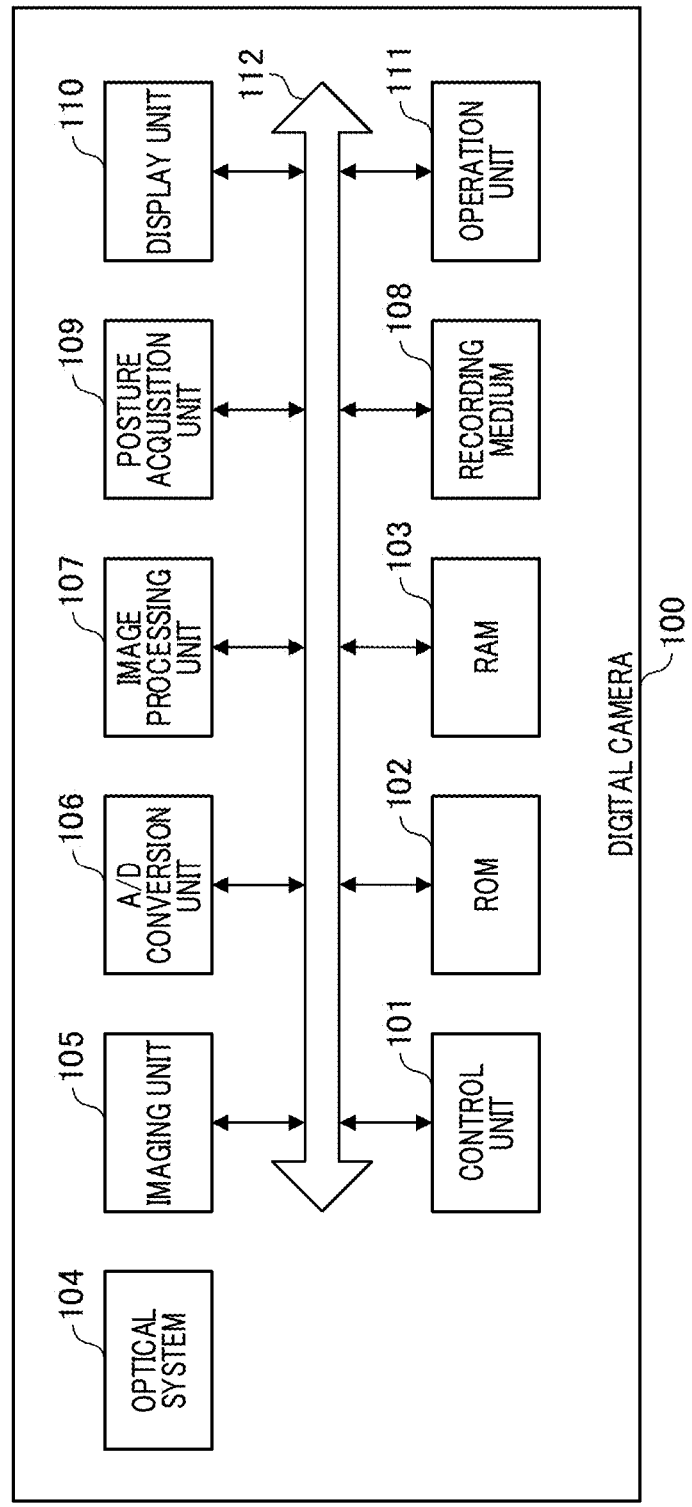
FIG. 1 is a block diagram illustrating a functional configuration of an image display device according to Example 1 of the present invention.

FIG. 1 is a block diagram illustrating a functional configuration of a digital camera according to Example 1 of the present invention.

In FIG. 1, a digital camera which is an imaging device is shown as an example of the image processing device, but the application scope of the present invention is not limited to the imaging device shown in FIG. 1. That is, the present invention can also be applied to an image processing device that outputs an image or a focus map to be described later to an external device and displays it on the external device, in addition to an image processing device that displays an image or a focus map. Meanwhile, in the drawings to be described below, components having the same functions are denoted by the same reference numerals and signs, and thus description thereof may be omitted or simplified.

A digital camera 100 includes a control unit 101 to a bus 112. The control unit 101, a ROM 102, a RAM 103, an imaging unit 105, an A/D conversion unit 106, an image processing unit 107, a recording medium 108, a posture acquisition unit 109, a display unit 110 and an operation unit 111 are connected to the bus 112.

The control unit 101 controls the entirety of the digital camera 100, and is, for example, a CPU. The control unit 101 reads out an operation program of each component included in the digital camera 100 from the ROM 102, and controls an operation of each component included in the digital camera 100 by developing and executing the operation program in the RAM 103. The CPU is an abbreviation for central processing unit. The ROM is an abbreviation for read only memory. In addition, the RAM is an abbreviation for random access memory. The ROM 102 is a rewritable non-volatile memory, and stores parameters or the like required for the operation of each component, in addition to the operation program of each component included in the digital camera 100. As the ROM 102, for example, a flash ROM or the like is used. The RAM 103 is a rewritable volatile memory, and is used as a transitory storage region of data which is output in the operation of each component included in the digital camera 100. The control unit 101 and the image processing unit 107 use the RAM 103 as a work memory.

An optical system 104 forms a subject image on the imaging unit 105. The optical system 104 includes, for example, a fixed lens, a variable-power lens that changes a focal length, a focus lens that performs focus adjustment, or the like. The optical system 104 also includes a diaphragm, and adjusts the amount of light during image capture by adjusting an aperture diameter of the optical system through the diaphragm.

The imaging unit 105 includes an imaging element such as, for example, a CCD image sensor or a CMOS image sensor. The imaging unit 105 photoelectrically converts an optical image formed on the imaging element by the optical system 104 and obtains an analog image signal. The imaging unit 105 outputs the obtained analog image signal to the A/D conversion unit 106. CCD is an abbreviation for charge coupled device. CMOS is an abbreviation for complementary metal oxide semiconductor.

The A/D conversion unit 106 applies an A/D conversion process to the input analog image signal and obtains a digital image data. The A/D conversion unit 106 outputs the obtained digital image data to the RAM 103 and causes the RAM to store the digital image data. In this case, the control unit 101 also causes the RAM 103 to store vertical or horizontal information indicating whether an image is a vertical composition or a horizontal composition together with the image. The control unit 101 can determine whether each image is a vertical composition or a horizontal composition by reading out the vertical or horizontal information of the RAM 103.

The image processing unit 107 performs image processing on the image data stored in the RAM 103. Specifically, the image processing unit 107 performs various types of image processing such as, for example, white balance adjustment, color interpolation, processing such as reduction/enlargement, generation of an evaluation value map (distribution information of evaluation values), and filter processing. The image processing unit 107 records an image after image processing in the recording medium 108.

The recording medium 108 is, for example, a memory card attachable to or detachable from the digital camera 100, or the like. An image processed by the image processing unit 107 which is stored in the RAM 103, an image on which A/D conversion is performed by the A/D conversion unit 106, or the like is recorded, as a recorded image, in the recording medium 108.

The posture acquisition unit 109 is, for example, an acceleration sensor. The posture acquisition unit 109 acquires the posture of the digital camera 100, that is, the posture of the display unit 110.

The display unit 110 is, for example, a liquid crystal monitor. The display unit 110 displays an image processed by the image processing unit 107 which is stored in the RAM 103, an image on which A/D conversion is performed by the A/D conversion unit 106, an image recorded in the recording medium 108, or the like in accordance with a user's operation.

Meanwhile, the image processing device according to the present invention may be configured not to include the display unit 110. In this case, a display device having a function equivalent to the function of the display unit 110 is provided outside of the image processing device, and the image processing device may include an output unit configured to output display data to the display device. In addition, in this case, the imaging device may be configured to include the image processing device and the display device. The display unit 110 is an example of the output unit configured to output an image. The digital camera 100 may include a transmission unit that transmits an image to an external device as an example of the output unit. The control unit 101 may control the transmission unit, and execute output control for transmitting an image to an external device and displaying the image on the external device.

The operation unit 111 is an input device for accepting a user's operation which includes a character information input device such as a keyboard, a pointing device such as a mouse or a touch panel, a button, a dial, a joystick, a touch sensor, a touch pad, or the like. The touch panel is an input device, formed flat to be superimposed on the liquid crystal monitor of the display unit 110, which is configured such that coordinate information according to a contact position, touch-on, or touch-off is output. The operation unit 111 accepts a user's action. Thereby, a user inputs various types of settings or various types of information of the digital camera 100. In addition, in the case of a configuration in which the display device is provided externally as described above, the operation unit 111 or the control unit 101 accepts an input by receiving coordinate information according to a contact position, and information such as touch-on or touch-off from a touch panel included in the external display device.

Meanwhile, if a touch panel is included in the operation unit 111, the control unit 101 can detect the following operations or states of the touch panel.

A finger or a pen that does not touch the touch panel newly touching the touch panel. That is, a start of touching (hereinafter referred to as touch-down).

A state in which the touch panel is touched with a finger or a pen (hereinafter referred to as touch-on).

Moving in a state in which the touch panel is being touched with a finger or a pen (hereinafter referred to as touch-move).

Removing a finger or a pen that has been touching the touch panel. That is, termination of touching (hereinafter referred to as touch-up).

State in which nothing is touching the touch panel (hereinafter referred to as touch-off).

If the touch-down is detected, the touch-on is also detected simultaneously. Unless the touch-up is not detected after the touch-down, the touch-on normally continues to be detected. A state in which the touch-move is detected is also a state in which the touch-on is detected. Even in a case where the touch-on is detected, the touch-move is not detected unless a touch position is moved. After it has been detected that all fingers or pens which have been touching have undergone the touch-up, the touch-off is set.

The control unit 101 is notified of these operations and states, or position coordinates at which a finger or a pen touches the touch panel through an internal bus, and the control unit 101 determines what operation has been performed on the touch panel on the basis of the information that is notified of. For the touch-move, the direction of movement of a finger or a pen moving on the touch panel can also be determined for each vertical component or horizontal component on the touch panel on the basis of a change in position coordinates. In addition, when the touch-down is performed on the touch panel and then the touch-up is performed through a constant touch-move, this movement is regarded as drawing a stroke. An operation of drawing a stroke quickly is referred to as a flick. A flick is an operation in which a finger is quickly moved by a certain distance with the finger touching the touch panel and then removed therefrom. In other words, a flick is an operation of quickly tracing on the touch panel with the finger. If it is detected that the touch-move has been performed over a predetermined distance or longer at a predetermined speed or higher, and the touch-up is then detected, it can be determined that a flick has been performed. In addition, if it is detected that the touch-move has been performed over a predetermined distance or longer at a predetermined speed or lower, it is determined that a drag has been performed. The touch panel may use any system among various systems such as a resistance film system, a capacitance system, a surface acoustic wave system, an infrared system, an electromagnetic induction system, an image recognition system, and an optical sensor system. Depending on systems, although there are a system in which it is detected that a touch is present on the basis of the presence of contact with the touch panel, and a system in which it is detected that a touch is present on the basis of the presence of proximity of a finger or a pen to the touch panel, any system may be used.

The bus 112 connects each component included in the digital camera 100. Each component included in the digital camera 100 transmits and receives various types of signals and various types of data through the bus 112.

The image processing unit 107 analyzes an image signal acquired by the imaging unit 105, to thereby acquire a focus map as distribution information of evaluation values corresponding to an image relating to the image signal. The focus map is information relevant to the focus distribution of a subject (focus distribution information). The focus map is an image which is acquired by the image processing unit 107. The image processing unit 107 stores the acquired focus map in the RAM 103.

Figure 2:
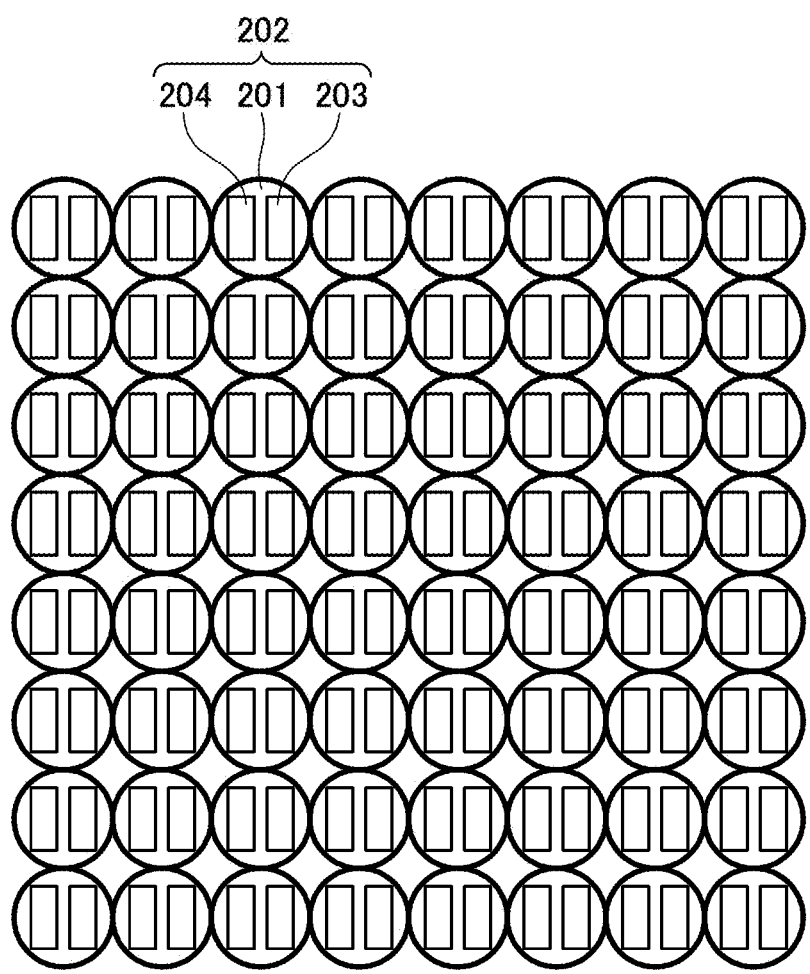
FIG. 2 is a diagram illustrating a configuration of an imaging unit according to Example 1 of the present invention.

FIG. 2 is a diagram illustrating a configuration of the imaging unit 105.

The imaging unit 105 includes an imaging element shown in FIG. 2. The imaging element shown in FIG. 2 includes a plurality of pixels 202 having a plurality of (two in FIG. 2) photoelectric conversion units 203 and 204 with respect to one microlens 201. The plurality of pixels 202 are regularly arrayed two-dimensionally. Each of the photoelectric conversion units 203 and 204 included in a pixel 202 photoelectrically converts light having passed through a different exit pupil of the optical system 104. Thereby, an image A and an image B are output as a pair of images (two images) from the pixel 202. That is, the imaging element outputs two images corresponding to light passing through different pupil regions.

The image processing unit 107 included in the digital camera 100 further outputs a distribution relating to a phase difference (phase difference distribution) between the image A and the image B, as a focus map, in accordance with control of the control unit 101. The image processing unit 107 may detect a distribution of the amount of defocus and output a focus map by applying, for example, a technique disclosed in Japanese Patent Laid-Open No. 2008-015754. The image processing unit 107 may acquire a distribution of the amount of shift which is the amount of deviation between the image A and the image B as a focus map. In addition, the amount of shift may be expressed in units of length such as a micrometer by multiplying by a detection pitch (an arrangement pitch of pixels of the same kind). In addition, the image processing unit 107 may acquire a distribution of values obtained by normalizing the amount of defocus with a focal depth (2Fδ or 1Fδ; F is an aperture value, and δ is the diameter of a permissible circle of confusion) as a focus map.

Figure 3:
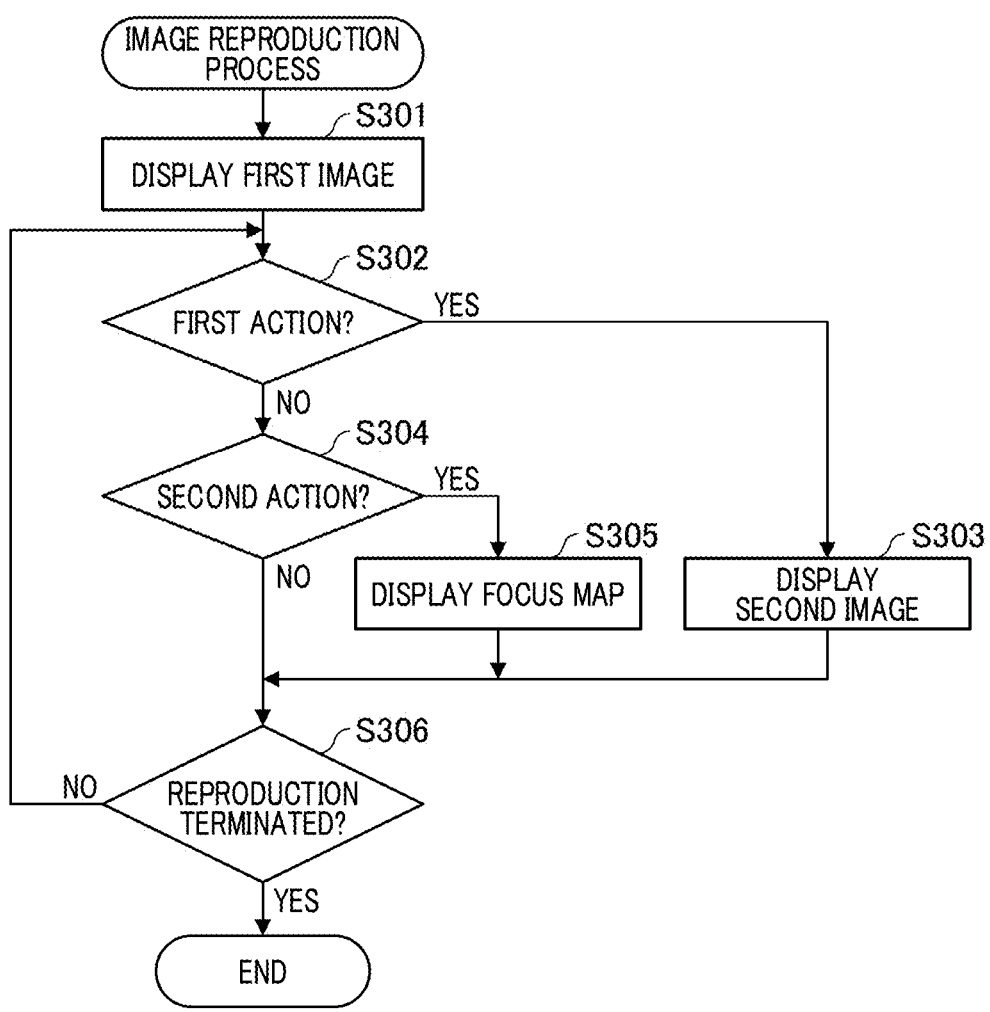
FIG. 3 is a flow chart illustrating an image reproduction process according to Example 1 of the present invention.
Figure 4C:
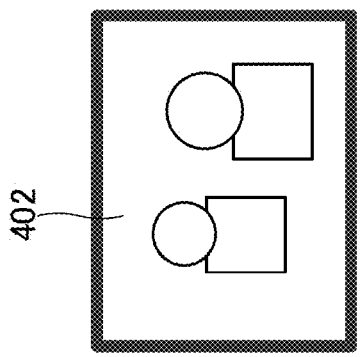
FIGS. 4A to 4C are diagrams illustrating an image feeding function in a horizontal composition image.
Figure 4B:
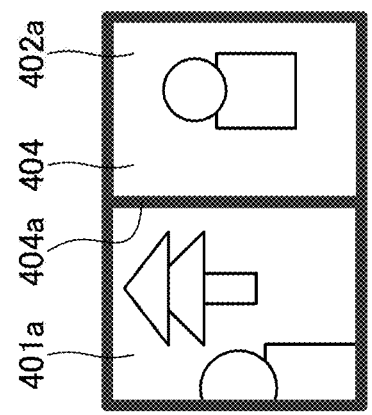
Figure 4A:
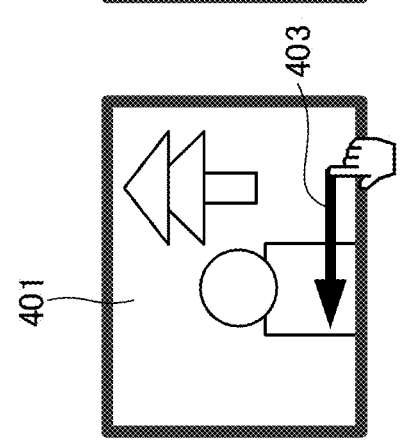
Figure 5A:
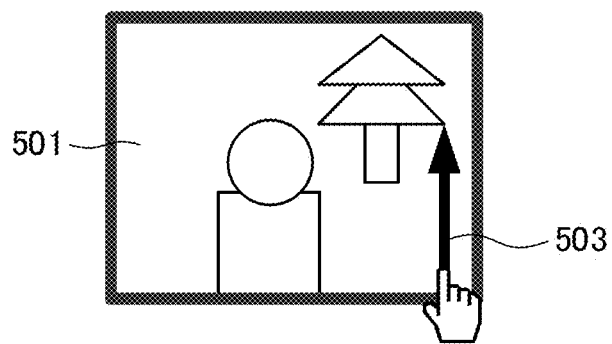
FIGS. 5A to 5C are diagrams illustrating a method of displaying a focus map in a horizontal composition image according to Example 1 of the present invention.
Figure 5B:
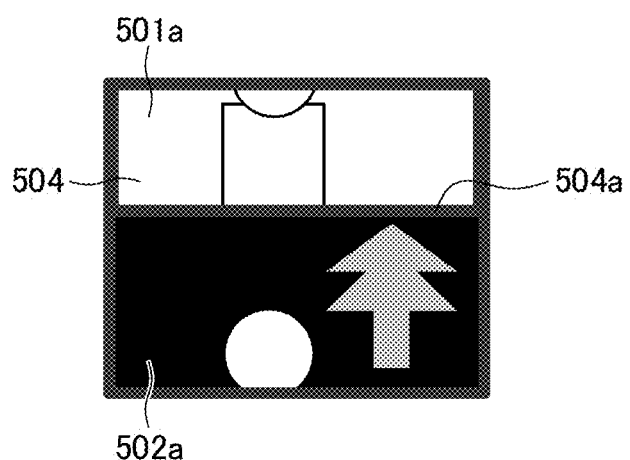
Figure 5C:
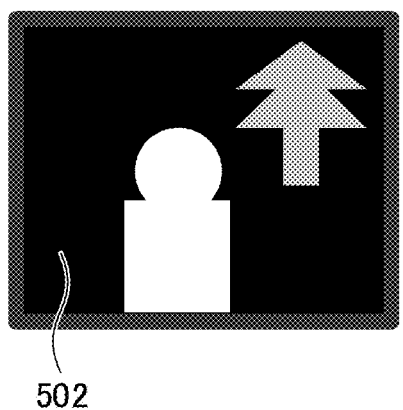
Figure 7A:
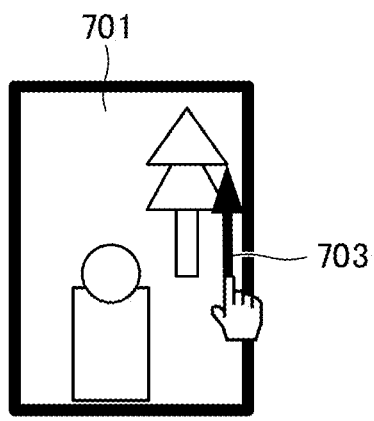
FIGS. 7A to 7C are diagrams illustrating a method of displaying a focus map in a vertical composition image according to a first embodiment of the present invention.
Figure 7B:
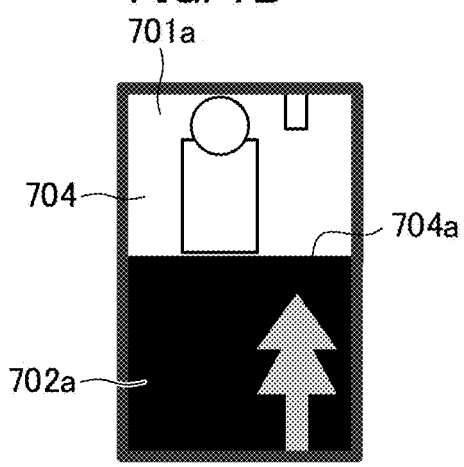
Figure 7C:
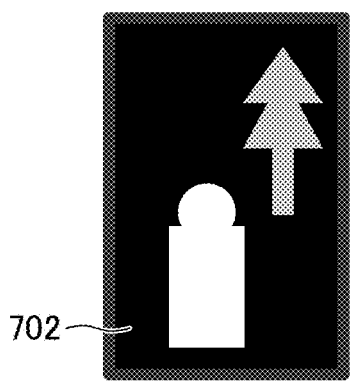

FIG. 3 is a flow chart illustrating an image reproduction process of displaying an image on the display unit 110. FIGS. 4A, 4B and 4C are diagrams illustrating an image feeding function in an image reproduction process in which the display unit 110 displays a captured image of a horizontally long aspect ratio (a horizontal composition) in a display region of a horizontally long aspect ratio (a horizontally long screen) within a display screen. FIGS. 5A, 5B and 5C are diagrams illustrating a focus map display function in an image reproduction process in which the display unit 110 displays a captured image of a horizontal composition in the case of a horizontally long screen. FIGS. 6A, 6B and 6C are diagrams illustrating an image feeding function in an image reproduction process in which the display unit 110 displays a captured image of a vertically long aspect ratio (a vertical composition) in a display region of a vertically long aspect ratio (a vertically long screen) within a display screen. FIGS. 7A, 7B and 7C are diagrams illustrating a focus map display function in an image reproduction process in which the display unit 110 displays a captured image of a vertical composition in the case of a vertically long screen. As shown in FIGS. 6 and 7, since display of a captured image and display of a corresponding focus map are performed in a form in which each region of an image and the position of an evaluation value of a focus state corresponding to each region are synchronized with each other, a user can immediately recognize which region of an image shown a focus state corresponds to when a focus map is viewed. In addition, a user can intuitively recognize the focus state of each region by performing visualization through the conversion of focus information into a luminance or a color pixel signal, or the like. That is, a focus map as distribution information of evaluation values in which each evaluation value is visualized is displayed at the position of a region of an image to which each evaluation value corresponds. Meanwhile, the control unit 101 can determine whether an image is a vertical composition or a horizontal composition on the basis of the vertical or horizontal information stored in the RAM 103 together with an image. The control unit 101 may detect that the display unit 110 is displaying a captured image on a horizontally long screen or is displaying a captured image on a vertically long screen using any kind of known method. In addition, in the horizontally long screen and the vertically long screen, the entire display region of the display screen of the display unit 110 need not necessarily be used, or a captured image or a display region for focus map display may be set to be horizontally long or vertically long in a portion of the display region.

First, an image feeding function will be described with reference to FIGS. 4A, 4B and 4C. The image feeding function is a function which is controlled and realized by the control unit 101, and is a function of switching an image which is displayed on the display unit 110 from a first image to a second image by the operation unit 111 accepting a user's action during image reproduction.

FIG. 4A is a diagram in which a first image 401 is displayed on the display unit 110. Here, a process of switching from a state in which the first image 401 is displayed on the display unit 110 to a state in which a second image 402 is displayed will be described. As shown in FIG. 4A, in a state in which the first image 401 is displayed on the display unit 110, a user performs an action 403 on the operation surface of the operation unit 111 which is a touch panel formed integrally with the display unit 110. In the present example, the action 403 as the first action is a horizontal swipe operation on the operation surface of the operation unit 111. In the present invention, the first action is not limited thereto, and may be any kind of operation on the digital camera 100. The first action is, for example, an action in a first direction.

The action 403 is a swipe operation in a direction indicated by the arrow of FIG. 4A, but may be a flick operation in a direction indicated by the arrow of FIG. 4A. The control unit 101 executes output control for displaying the second image 402 on the display unit 110 in accordance with the operation unit 111 accepting the action 403. In the output control performed by the control unit 101, the display on the display unit 110 may be switched from the first image 401 to the second image 402 without interposing display of any other content. FIG. 4C is a diagram in which the second image 402 is displayed on the display unit 110.

However, in the present example, when the display on the display unit 110 is switched from the first image 401 to the second image 402, display of a content 404 is interposed therebetween. FIG. 4B is a diagram illustrating the display unit 110 that displays the content 404. The content 404 is a content displaying a partial image 401a which is a portion of the first image 401, a partial image 402a which is a portion of the second image 402, and a boundary line 404a indicating a boundary between the partial image 401a and the partial image 402a. The boundary line 404a is a line that extends in a vertical direction, and the partial image 401a is displayed on its left side, and the partial image 402a is displayed on its right side. The content 404 is a content in which the display proportion of the partial image 401a in the display unit 110 is gradually decreased and the display proportion of the partial image 402a is gradually increased by moving the display position of the boundary line 404a from right to left. Display in which the display proportions of the partial image 401a and the partial image 402a are gradually changed may be changed in accordance with the operation amount of swiping of the swipe operation of the action 403. If a user makes the swipe operation become stationary halfway in the state of the touch-on, the partial image 401a and the partial image 402a may be displayed at a corresponding display proportion. By inserting the display of the content 404 during image feeding in this manner, it is possible to inform a user more intuitively that images which are displayed are being switched by performing a horizontal operation on the operation unit 111.

The control unit 101 executes output control for displaying (FIG. 4A) the first image 401 on the display unit 110, and executes output control for displaying (FIG. 4B) the content 404 on the display unit 110 in accordance with the operation unit 111 accepting the action 403. Thereafter, the control unit 101 executes output control for displaying (FIG. 4C) the second image 402 on the display unit 110.

Next, a focus map display function will be described with reference to FIGS. 5A, 5B and 5C. The focus map display function is a function which is controlled and realized by the control unit 101, and is a function of switching an image which is displayed on the display unit 110 from a first image to a focus map by the operation unit 111 accepting a user's action during image reproduction. Meanwhile, in the present example, the focus map is distribution information of the amount of defocus, and in the drawings, the amount of defocus is represented in shades of gray scale, but the present invention is not limited thereto.

FIG. 5A is a diagram in which a first image 501 is displayed on the display unit 110. Here, a process of switching from a state in which the first image 501 is displayed on the display unit 110 to a state in which a focus map 502 is displayed will be described. As shown in FIG. 5A, in a state in which the first image 501 is displayed on the display unit 110, a user performs an action 503 on the operation surface of the operation unit 111. In the present example, the action 503 as a second action is a vertical swipe operation on the operation surface of the operation unit 111. In the present invention, the second action is not limited thereto, and may be any kind of operation on the digital camera 100 if it is an operation different from the first action. The second action is, for example, an action in a second direction different from the first direction. The second direction is, for example, a direction perpendicular to the first direction.

The action 503 is a swipe operation in a direction indicated by the arrow of FIG. 5A, but may be a flick operation in a direction indicated by the arrow of FIG. 5A. The control unit 101 executes output control for displaying the focus map 502 on the display unit 110 in accordance with the operation unit 111 accepting the action 503. In the output control performed by the control unit 101, the display on the display unit 110 may be switched from the first image 501 to the focus map 502 without interposing display of any other content. FIG. 5C is a diagram in which the focus map 502 is displayed on the display unit 110. The focus map 502 is a focus map as distribution information of evaluation values corresponding to the first image 501 acquired by the image processing unit 107.

However, in the present example, when the display on the display unit 110 is switched from the first image 501 to the focus map 502, display of a content 504 is interposed therebetween. FIG. 5B is a diagram illustrating the display unit 110 that displays the content 504. The content 504 is a content displaying a partial image 501a which is a portion of the first image 501, a partial focus map 502a which is a portion of the focus map 502, and a boundary line 504a indicating a boundary between the partial image 501a and the partial focus map 502a. The boundary line 504a is a line that extends in a horizontal direction, and the partial image 501a is displayed on the side thereabove, and the partial focus map 502a is displayed on the side therebelow. The content 504 is a content in which the display proportion of the partial image 501a in the display unit 110 is gradually decreased and the display proportion of the partial focus map 502a is gradually increased by moving the display position of the boundary line 504a from the bottom to the top. Similarly to the display of the content 404, in the display of the content 504, the display proportions of the partial image 501a and the partial focus map 502a may also be controlled in accordance with the operation amount of swiping of the swipe operation of the action 503. In this manner, here, the display of the content 504 is inserted during display switching from the first image 501 to the focus map 502. In this manner, it is possible to inform a user more intuitively that displays of a captured image and a focus map which are in a correspondence relation to each other are being switched between by performing a vertical operation on the operation unit 111. In addition, if the control unit 101 further accepts the action 503 in a state in which the focus map 502 is displayed, output control may be performed so as to be switched to display indicating additional information other than the focus map 502. The additional information other than the focus map 502 corresponds to the first image 501 similarly to a focus map. The additional information is, for example, image capturing conditions such as the date and time of image capture, a diaphragm, a shutter speed, a focal length, or an image capture mode, image processing parameters such as the presence or absence of shading correction or the presence or absence of white balance correction, and the like.

The control unit 101 executes output control for displaying (FIG. 5A) the first image 501 on the display unit 110, and executes output control for displaying (FIG. 5B) the content 504 on the display unit 110 in accordance with the operation unit 111 accepting the action 503. Thereafter, the control unit 101 executes output control for displaying (FIG. 5C) the focus map 502 on the display unit 110. According to the focus map display function of the present example, it is possible to display a focus map corresponding to an image without damaging an operation feeling of the image feeding function during image reproduction.

In FIGS. 4A to 4C and FIGS. 5A to 5C, a case where the first image is a horizontal composition will be described. Hereinafter, a case where a first image of a vertical composition is displayed on the vertically long screen of the display unit 110 will be described.

FIG. 6A is a diagram in which a first image 601 which is an image of a vertical composition is displayed on the display unit 110. As shown in FIG. 6A, in a state in which the first image 601 is displayed on the display unit 110, a user performs an action 603 on the operation surface of the operation unit 111. In the present example, the action 603 as the first action is a swipe operation on the operation surface of the operation unit 111 in a direction indicated by the arrow of FIG. 6A.

The control unit 101 executes output control for displaying a second image 602 on the display unit 110 in accordance with the operation unit 111 accepting the action 603. FIG. 6C is a diagram in which the second image 602 is displayed on the display unit 110. In the present example, when the display on the display unit 110 is switched from the first image 601 to the second image 602, display of a content 604 is interposed between. FIG. 6B is a diagram illustrating the display unit 110 that displays the content 604. The content 604 is a content displaying a partial image 601a which is a portion of the first image 601, a partial image 602a which is a portion of the second image 602, and a boundary line 604a indicating a boundary between the partial image 601a and the partial image 602a. The boundary line 604a is a line that extends in a vertical direction, and the partial image 601a is displayed on its left side, and the partial image 602a is displayed on its right side. The content 604 is a content in which the display proportion of the partial image 601a in the display unit 110 is gradually decreased and the display proportion of the partial image 602a is gradually increased by moving the display position of the boundary line 604a from right to left. Similarly to the display of the content 404, in the display of the content 604, the display proportions of the partial image 601a and the partial image 602a may also be controlled in accordance with the operation amount of swiping of the swipe operation of the action 603. By inserting the display of the content 604 during image feeding in this manner, it is possible to inform a user more intuitively that images which are displayed are being switched by performing a horizontal operation on the operation unit 111.

The control unit 101 executes output control for displaying (FIG. 6A) the first image 601 on the display unit 110, and executes output control for displaying (FIG. 6B) the content 604 on the display unit 110 in accordance with the operation unit 111 accepting the action 603. Thereafter, the control unit 101 executes output control for displaying (FIG. 6C) the second image 602 on the display unit 110.

FIG. 7A is a diagram in which a first image 701 which is an image of a vertical composition is displayed on the display unit 110. As shown in FIG. 7A, in a state in which the first image 701 is displayed on the display unit 110, a user performs an action 703 on the operation surface of the operation unit 111. In the present example, the action 703 as a second action is a swipe operation on the operation surface of the operation unit 111 in a direction indicated by the arrow of FIG. 7A.

The control unit 101 executes output control for displaying a focus map 702 on the display unit 110 in accordance with the operation unit 111 accepting the action 703. FIG. 7C is a diagram in which the focus map 702 is displayed on the display unit 110. The focus map 702 is a focus map as distribution information of evaluation values corresponding to the first image 701 acquired by the image processing unit 107.

In the present example, when the display on the display unit 110 is switched from the first image 701 to the focus map 702, display of a content 704 is interposed between. FIG. 7B is a diagram illustrating the display unit 110 that displays the content 704. The content 704 is a content displaying a partial image 701a which is a portion of the first image 701, a partial focus map 702a which is a portion of the focus map 702, and a boundary line 704a indicating a boundary between the partial image 701a and the partial focus map 702a. The boundary line 704a is a line that extends in a horizontal direction, and the partial image 701a is displayed on the side thereabove, and the partial focus map 702a is displayed on the side therebelow. The content 704 is a content in which the display proportion of the partial image 701a in the display unit 110 is gradually decreased and the display proportion of the partial focus map 702a is gradually increased by moving the display position of the boundary line 704a from the bottom to the top. Similarly to the display of the content 404, in the display of the content 704, the display proportions of the partial image 701a and the partial focus map 702a may also be controlled in accordance with the operation amount of swiping of the swipe operation of the action 703. In this manner, here, the display of the content 704 is inserted during display switching from the first image 701 to the focus map 702. In this manner, it is possible to inform a user more intuitively that displays of a captured image and a focus map which are in a correspondence relation to each other are being switched between by performing a vertical operation on the operation unit 111. In addition, if the control unit 101 further accepts the action 703 in a state in which the focus map 702 is displayed, output control may be performed so as to be switched to display indicating information other than the focus map 702 corresponding to the first image 701. The information other than the focus map 702 corresponding to the first image 701 is, for example, image capturing conditions such as the date and time of image capture, a diaphragm, a shutter speed, or a focal length, and additional information such as an image capture mode.

The control unit 101 executes output control for displaying (FIG. 7A) the first image 701 on the display unit 110, and executes output control for displaying (FIG. 7B) the content 704 on the display unit 110 in accordance with the operation unit 111 accepting the action 703. Thereafter, the control unit 101 executes output control for displaying (FIG. 7C) the focus map 702 on the display unit 110.

The control unit 101 executes an image reproduction process (a process of FIG. 3) of displaying an image on the display unit 110 by accepting an operation of a user who gives an instruction for the execution of the image reproduction process. Hereinafter, a description will be given with reference to the flow chart of FIG. 3. First, the control unit 101 executes output control for displaying (FIGS. 4A, 5A, 6A, and 7A) a first image according to an operation of a user who gives an instruction for the execution of the image reproduction process on the display unit 110 (step S301).

Subsequently, the control unit 101 determines whether the operation unit 111 has accepted the first action (the action 403 or the action 603) (step S302). If the operation unit 111 accepts the first action (step S302: Yes), the process proceeds to step S303. The control unit 101 executes output control for displaying (FIGS. 4B, 4C, 6B, and 6C) a second image which is an image subsequent to the first image on the display unit 110 (step S303). The control unit 101 terminates the image reproduction process (the process of FIG. 3) by accepting an operation of a user who gives an instruction for the termination of the image reproduction process (step S306: Yes). The control unit 101 returns to step S302 and repeats processing according to a user's operation until reproduction is terminated in step S306 (step S306: No).

If the operation unit 111 does not accept the first action (step S302: No), the control unit 101 determines whether the operation unit 111 has accepted the second action (the action 503 or the action 703) (step S304). If the operation unit 111 accepts the second action (step S304: Yes), the process proceeds to step S305. The control unit 101 executes output control for displaying (FIGS. 5B, 5C, 7B, and 7C) a focus map corresponding to the first image on the display unit 110 (step S305). The control unit 101 terminates the image reproduction process (the process of FIG. 3) by accepting an operation of a user who gives an instruction for the termination of the image reproduction process (step S306: Yes). The control unit 101 returns to step S302 and repeats processing according to a user's operation until reproduction is terminated in step S306 (step S306: No).

As described above, in the present example, it is possible to perform display of evaluation values of a displayed image together with image feeding during reproduction and display of a captured image. Further, according to the image feeding function and the focus map display function of the present example, it is possible to intuitively perform an operation of switching to focus map display corresponding to an image without damaging an operation feeling of the image feeding function during image reproduction.

In the present example, although a configuration in which a focus map is displayed as distribution information of evaluation values has been used, the present invention is not limited thereto, and can also be applied to the case of display of setting of evaluation values other than a focus, as the distribution information of evaluation values, to a map. The distribution information of evaluation values may be, for example, distribution information of the degree of blurring on one surface of an image based on a motion vector or the like obtained from image data. In addition, the distribution information of evaluation values may be, for example, distribution information of degree of halation or blackout on one surface of an image obtained by determining the level of an image signal. In addition, the distribution information of evaluation values may be, for example, distribution information of distance information on one surface of an image obtained by further converting a focus map into a subject distance on the basis of lens information or image capturing conditions, or the like. In addition, the distribution information of evaluation values may be, for example, information of a normal direction distribution on one surface of an image obtained by an image analysis. In addition, the distribution information of evaluation values may be, for example, probability distribution information of semantic region division (for example, recognition score distribution information of persons, plants, behavior detection, or the like) on one surface of an image obtained by performing subject detection, motion detection or the like through an image analysis. In addition, an embodiment in which at least any one of these pieces of distribution information of evaluation values is displayed may be used. An aspect in which multiple types of pieces of distribution information of evaluation values are displayed in order at every switching operation may be used.

In the present example, the amount of defocus calculated on the basis of the amount of shift between two pieces of pixel data is defined as focus information, but the present invention is not limited thereto. The focus information may be, for example, the amount of defocus using a depth from defocus (DFD) scheme for acquiring the amount of defocus from a correlation between two images of which the focuses or aperture values are different from each other. In addition, in the focus information, for example, distance information obtained from a distance measuring sensor module of a time of flight (TOF) scheme or the like may be used. This distance information is depth information indicating the depth of a subject within an image in a depth direction. With such a configuration, a user can also utilize a focus map in ascertaining the state of focusing and then determining the focal length of the optical system. In addition, if a distance is normalized with the forward depth of field and the backward depth of field, it is more convenient to ascertain the state of focusing. In addition, the control unit 101 may acquire distribution information of distance information using the parallax of a multi-eye optical system in which a plurality of lenses are lined up in addition to the TOF scheme, or may acquire it by converting the amount of defocus into a distance.

Figure 17:
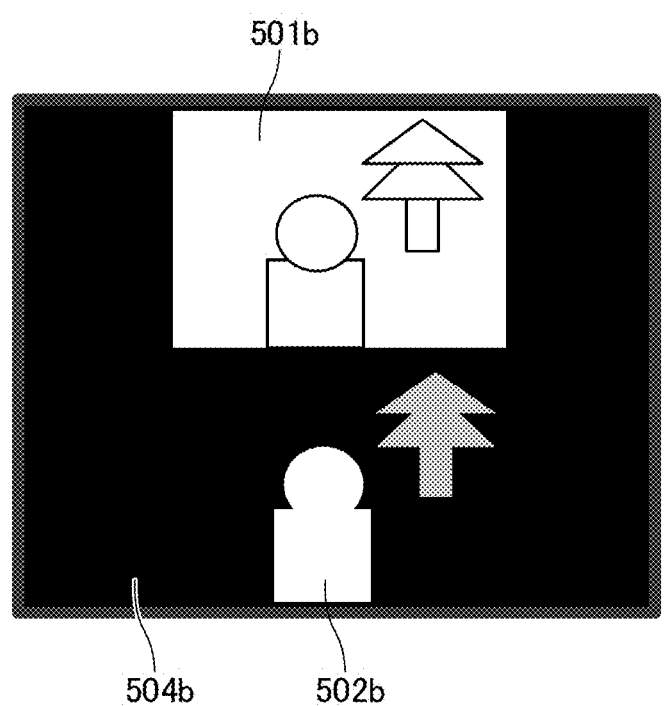
FIG. 17 is a diagram illustrating a modification example of the method of displaying a focus map in a horizontal composition image according to Example 1 of the present invention.

In the present example, the focus map 502 is displayed in accordance with the second action (the action 503 of FIG. 5), but the present invention is not limited thereto. For example, the control unit 101 may execute output control for displaying a content 504*b* (see FIG. 17) on the display unit 110 in accordance with the operation unit 111 accepting the action 503. The content 504b is a content in which an image 501b obtained by reducing the first image 501 of a horizontal composition and a focus map 502b obtained by reducing the focus map 502 are disposed and displayed on one screen vertically side by side. By taking a display form like the content 504b, a user can glance through and confirm focus information (evaluation value information) of a corresponding subject (region) while confirming an original captured image. Further, if the second action (the action 503) is accepted in a state in which the content 504b is displayed, the control unit 101 may execute output control for displaying the focus map 502 on one surface.

In addition, for example, the control unit 101 may execute output control for displaying a focus map and an image obtained by superimposing the transmissive focus map 502 over the first image 501 on the display unit 110 in accordance with the operation unit 111 accepting the action 503. By taking a display form in which a focus map and an image obtained by transmitting and superimposing the focus map 502 are displayed in this manner, a user can easily confirm correspondence between a subject (region) of an original captured image and focus information (evaluation value information) in a focus map. In addition, in such an embodiment of transmissive display, the control unit may execute output control for performing display so that the focus map 502 is superimposed by gradually increasing a superposition region from an image end on the same side as the starting point of a swipe operation in the operation direction of swipe. In the display in which the focus map 502 is superimposed, a superposition region may be gradually increased in accordance with the operation amount of swiping of the swipe operation of the action 503.

In the present example, the amount of defocus is represented in shades of gray scale, but the present invention is not limited thereto. For example, the control unit 101 may execute output control for displaying distribution information of the amount of defocus on the display unit 110 with a color contour map. In addition, for example, the control unit 101 may paint a point which is in focus in any color in distribution information of focus information to execute output control for displaying it on the display unit 110. In addition, for example, the control unit 101 may superimpose any color on a point which is in focus in the distribution information of focus information to execute output control for displaying it on the display unit 110. In addition, for example, the control unit 101 may shape the distribution information of focus information in a three-dimensional graph form to execute output control for displaying it on the display unit 110.

In the present example, the first action (the action 403) is defined as a horizontal swipe operation on the operation surface of the operation unit 111, and the second action (the action 503) is defined as a vertical swipe operation on the operation surface of the operation unit 111, but the present invention is not limited thereto. For example, the first action may be defined as a vertical swipe operation on the operation surface of the operation unit 111, and the second action may be defined as a horizontal swipe operation on the operation surface of the operation unit 111. In addition, for example, the first action and the second action may be limited to an action for a position at which the first image is displayed on the display unit 110 on the operation surface of the operation unit 111.

In the present example, in the display on the display unit 110, an example has been shown in which, if a captured image of a horizontal composition is displayed on a horizontally long screen, image feeding is performed by the horizontal action 403, and switching to the focus map 502 is performed by the vertical action 503. However, in the present example, even if a captured image of a vertical composition is displayed by blacking out right and left regions on a horizontally long screen, similarly, image feeding is performed by the horizontal action 403, and switching to the focus map 502 is performed by the vertical action 503. In addition, in the present example, an example has been shown in which, if a captured image of a vertical composition is displayed on a vertically long screen, image feeding is performed by the horizontal action 603, and switching to the focus map 702 is performed by the vertical action 703. However, in the present example, even if a captured image of a horizontal composition is displayed by blacking out upper and lower regions on a vertically long screen, similarly, image feeding is performed by the horizontal action 603, and switching to the focus map 702 is performed by the vertical action 703.

In the present example, by using a touch panel as the operation unit that accepts a user's operation, the user feels like directly touching a displayed image, and thus has a tendency to understand intuitively. In addition, in the present example, a user's action relating to image feeding or switching of display between an image and distribution information of evaluation values is defined as a swipe operation in which a touch panel is used as the operation unit, but the present invention is not limited thereto. For example, as the first action is defined as an operation of tapping a short side out of four sides of the touch panel (short-side tap), the second action is defined as an operation of tapping a long side out of four sides of the touch panel (long-side tap), operations capable of being recognized by the control unit 101 may be used.

In addition, the present invention can also be applied using operation units other than the touch panel included in the operation unit 111. For example, if a digital camera includes a cross key-shaped operation unit as an operation unit, one of the horizontal input and vertical input of the cross key may be defined as the first action, and the other may be defined as the second action. For example, if a digital camera includes a stick-shaped operation unit, one of the horizontal input and vertical input of this operation unit may be defined as the first action, and the other may be defined as the second action. By using such an operation unit which is directly shifted by a user, the user can obtain a reliable operation feeling.

In addition, the present invention may use an electronic view finder (EVF) as the display unit. In this case, for example, using a visual line sensor that detects a user's visual line as the operation unit, one of the horizontal movement and vertical movement of the visual line may be defined as the first action, and the other may be defined as the second action. Thereby, it is possible to perform a simple operation without using a hand when an image is reproduced on an EVF.

In addition, the present invention may use a large-sized monitor such as a television as the display unit. In this case, for example, using a gesture detection unit that detects a user's gesture as the operation unit, one of a horizontal gesture and a vertical gesture may be defined as the first action, and the other may be defined as the second action. Thereby, it is possible to operate image display even if an image is viewed away from the display unit.

In addition, the present invention may be configured such that, when display is performed using an image display device included in a small-sized terminal device, an operation may be performed just by shifting the small-sized terminal device without touching the screen of the image display device. For example, using an acceleration sensor as the operation unit, one of the horizontal movement and vertical movement of the image display device may be defined as the first action, and the other may be defined as the second action. Thereby, it is possible to operate image display even in a small terminal which is difficult to dispose buttons or to perform a touch operation.

In addition, the present invention may use an operation unit considering an operation on a personal computer (PC). For example, using a mouse as the operation unit, one of the horizontal drag and vertical drag of the mouse may be defined as the first action, and the other may be defined as the second action. In this manner, it is possible to perform an operation even if there is no dedicated operation device such as a touch panel. In addition, for example, using a touch pad as the operation unit, one of the horizontal operation and vertical operation of the touch pad may be defined as the first action, and the other may be defined as the second action. In addition, for example, using a track ball as the operation unit, one of the horizontal rotation and vertical rotation of the track ball may be defined as the first action, and the other may be defined as the second action. That is, the first action and the second action may be the horizontal operation and vertical operation on the operation unit. Further, in the present invention, the first action and the second action may be accepted through an operation input at least one of operations from these various operation units described above. That is, operation inputs from the multiple types of operation units may be implemented so as to be capable of being accepted simultaneously or according to priority.

Example 2

Hereinafter, Example 2 of the present invention will be described in detail with reference to the accompanying drawings. Meanwhile, in the present example to be described below, a digital camera which is an example of the image processing device will also be described by way of example. The functional configuration of a digital camera according to Example 2 is the same as that in Example 1 shown in FIG. 1, and thus herein, a description will be given with reference to FIG. 1. In the present example, an example in which the control unit 101 executes output control for displaying an image and a focus map on the display unit 110 according to a posture of the display unit 110 or a setting of display will be described. specifically, in the present example, if an image of a horizontal composition is displayed by blacking out the upper and lower sides on, for example, a vertically long screen in accordance with a posture of the display unit 110 or a setting of the display unit, an image and a focus map are displayed side by side in a vertical direction. In this case, a focus map alone is not displayed in accordance with a display (switching) instruction for a focus map image. In addition, if an image of a vertical composition is displayed by blacking out the right and left sides on, for example, a horizontally long screen, a focus map alone is not displayed in accordance with a display (switching) instruction for a focus map image, and an image and a focus map are displayed side by side in a horizontal direction. Thereby, it is possible to glance through an image and a focus map by displaying a focus map effectively using a region which is not used in display of information due to being blacked out, which leads to an improvement in convenience.

Figure 8:
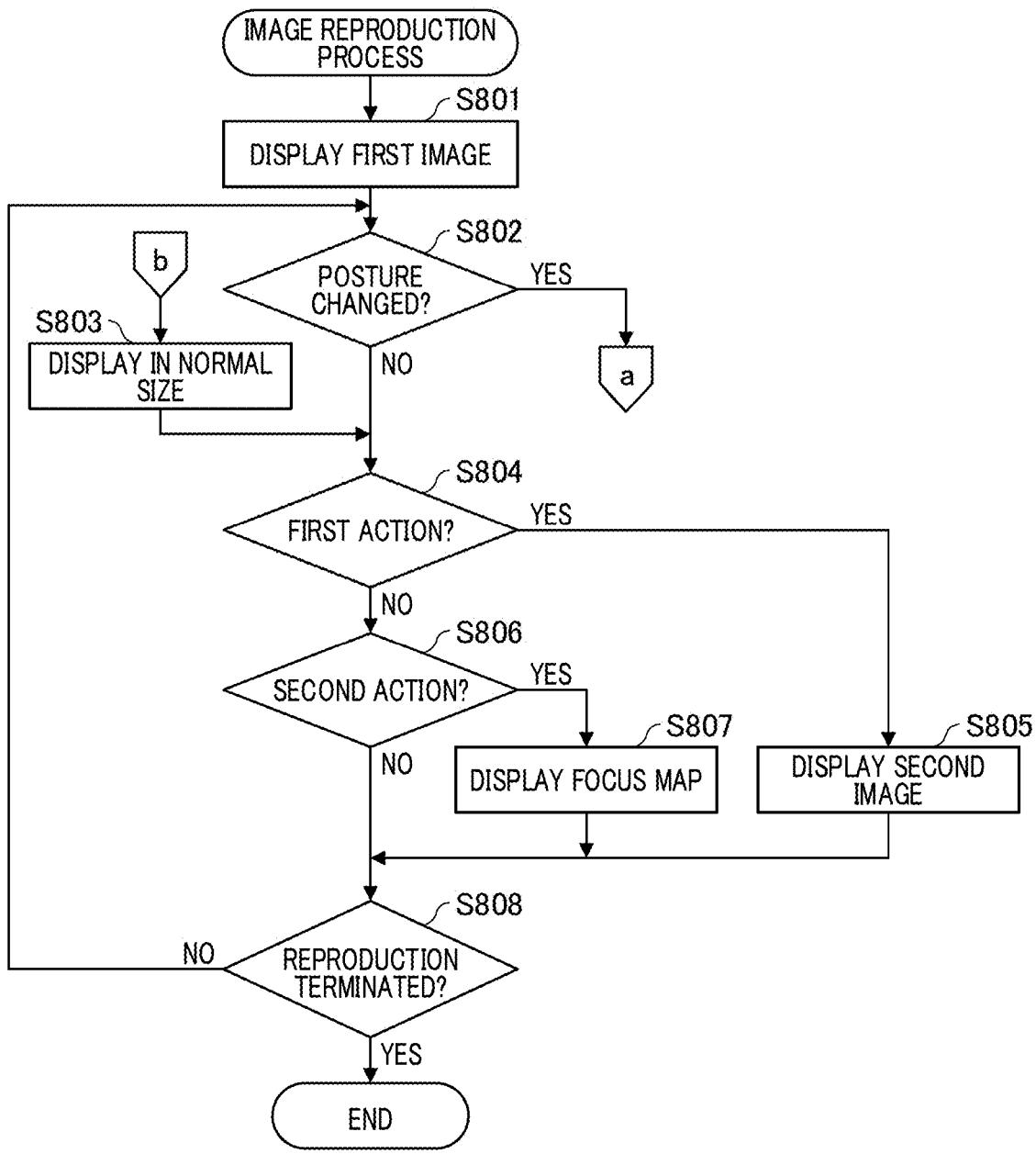
FIG. 8 is a flow chart illustrating an image reproduction process according to Example 2 of the present invention.
Figure 9:
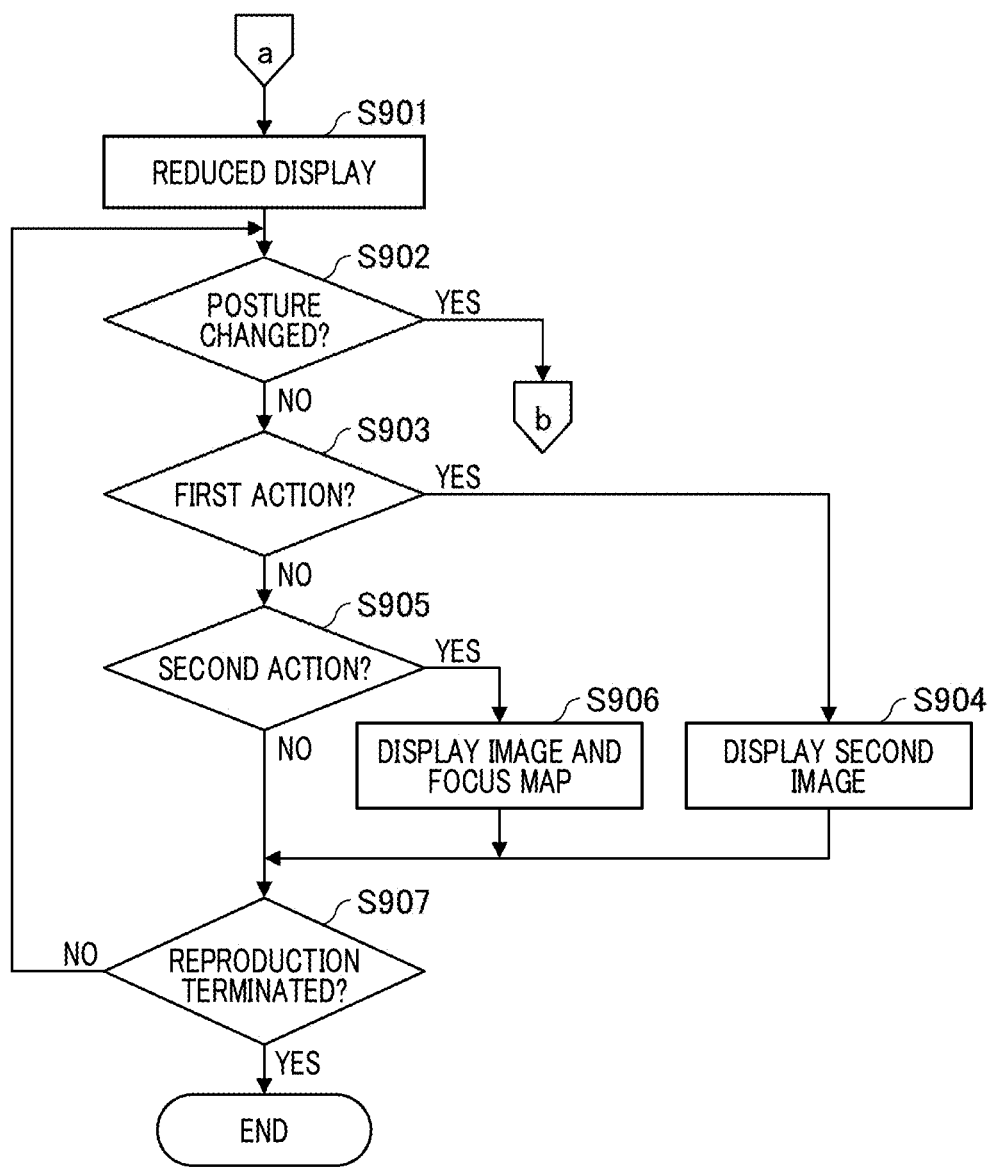
FIG. 9 is a flow chart illustrating an image reproduction process according to Example 2 of the present invention.
Figure 10A:
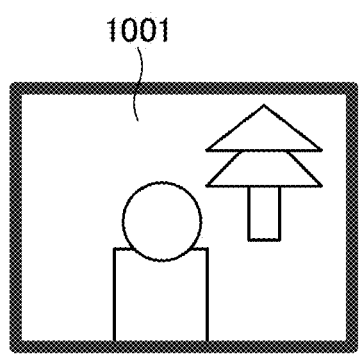
FIGS. 10A and 10B are diagrams illustrating a method of changing an image display method in accordance with the posture of a display unit in a horizontal composition image.
Figure 10B:
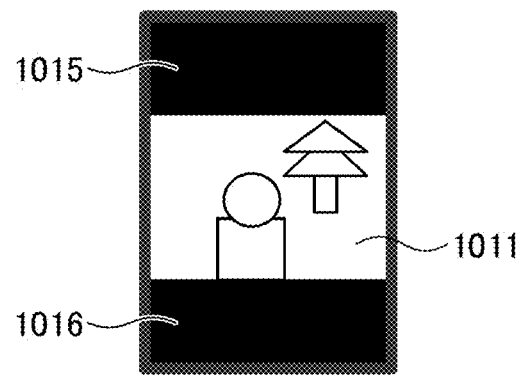

FIGS. 8 and 9 are flow charts illustrating an image reproduction process according to Example 2 of the present invention. FIGS. 10A and 10B are diagrams illustrating a method of changing an image display method in accordance with the posture of the display unit or the setting of display in a horizontal composition image. FIGS. 11A, 11B, 11C, 11D, 11E and 11F are diagrams illustrating a method of changing an image and focus map display method in accordance with the posture of the display unit in a horizontal composition image according to Example 2 of the present invention. FIGS. 12A and 12B are diagrams illustrating a method of changing an image display method in accordance with the posture of the display unit or the setting of display in a vertical composition image. FIGS. 13A, 13B, 13C, 13D, 13E and 13F are diagrams illustrating a method of changing an image and focus map display method in accordance with the posture of the display unit or the setting of display in a vertical composition image according to Example 2 of the present invention.

First, a posture corresponding image display function of displaying an image according to the posture of the display unit 110 will be described with reference to FIGS. 10A and 10B. The posture corresponding image display function is a function which is controlled and realized by the control unit 101, and is a function of switching an image which is displayed on the display unit 110 from a first image to a second image in accordance with the posture of the display unit 110 acquired by the posture acquisition unit 109 during image reproduction.

FIG. 10A is a diagram in which, when the display unit 110 is set in the direction of a horizontally long screen, a first image 1001 which is an image of a horizontal composition is displayed on the display unit 110. In this case, the control unit 101 causes the posture acquisition unit 109 to continuously acquire the posture of the display unit 110. The control unit 101 performs output control for switching the display on the display unit 110 from display of FIG. 10A to display of FIG. 10B in accordance with the posture of the display unit 110 acquired by the posture acquisition unit 109 being changed from the direction of a horizontally long screen to the direction of a vertically long screen. FIG. 10B is a diagram in which, when the display unit 110 is set in the direction of a vertically long screen, an image 1011 which is an image of a horizontal composition is displayed on the display unit 110. The image 1011 is an image obtained by reducing the first image 1001. The horizontal length of the image 1011 is equal to or less than the horizontal length of a display region when the display unit 110 is set to a vertically long screen. On the display screen of the display unit 110, a margin 1015 is disposed above the image 1011, and a margin 1016 is disposed below the image 1011. The control unit 101 may perform output control for displaying the margin 1015 and the margin 1016 in white on the display unit 110, or may perform output control for displaying the margin 1015 and the margin 1016 in colors other than white on the display unit 110. In FIG. 10B, the margin 1015 and the margin 1016 are painted and displayed in black. According to such a posture corresponding image display function, even if a user changes the posture of the display unit 110, the first image 1001 of a horizontal composition can be displayed on the display unit 110, as the image 1011, in the state of a horizontal composition. When the display unit 110 shows display of FIG. 10B, the control unit 101 performs output control for switching the display on the display unit 110 to the display of FIG. 10A in accordance with the posture of the display unit 110 acquired by the posture acquisition unit 109 being changed in the direction of a horizontally long screen.

Next, a focus map display function will be described with reference to FIGS. 11A, 11B, 11C, 11D, 11E and 11F. The focus map display function is a function which is controlled and realized by the control unit 101, and is a function of switching an image which is displayed on the display unit 110 from a first image to a focus map by the operation unit 111 accepting a user's action during image reproduction. Meanwhile, in the present example, the focus map is distribution information of the amount of defocus, and in the drawings, the amount of defocus is represented in shades of gray scale, but the present invention is not limited thereto.

Figure 11A:
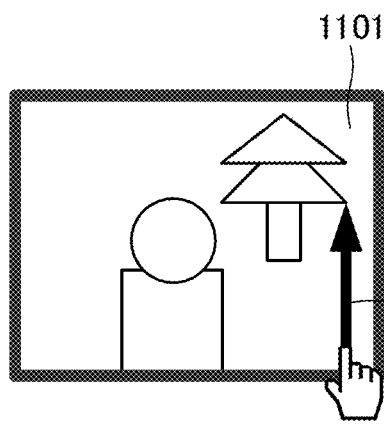
FIGS. 11A to 11F are diagrams illustrating a method of changing an image and focus map display method in accordance with the posture of the display unit in a horizontal composition image according to Example 2 of the present invention.
Figure 11D:
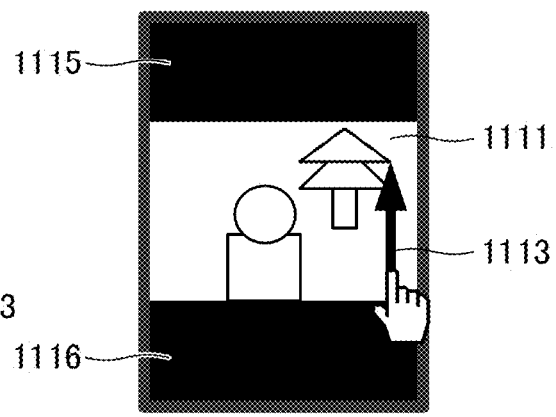
Figure 11B:
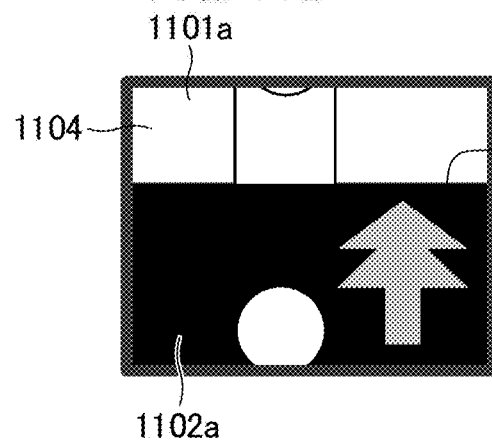
Figure 11E:
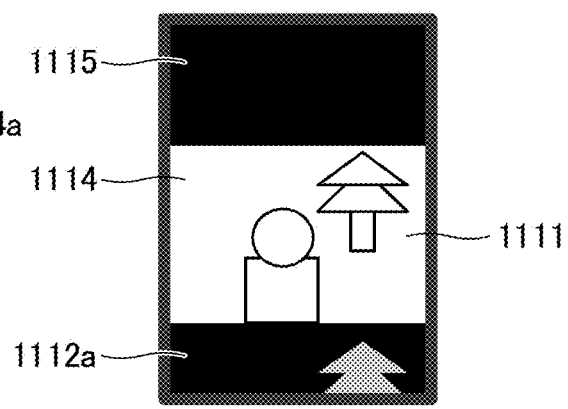
Figure 11C:
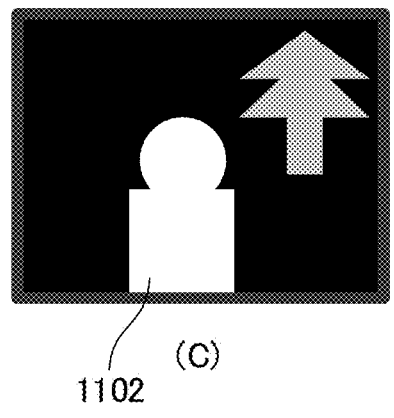
Figure 12A:
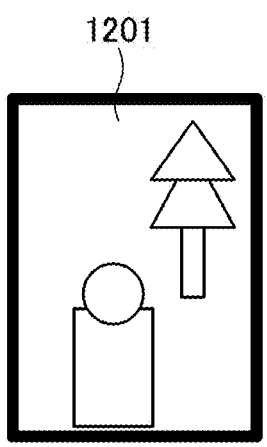
FIGS. 12A and 12B are diagrams illustrating a method of changing an image display method in accordance with the posture of the display unit in a vertical composition image.
Figure 12B:
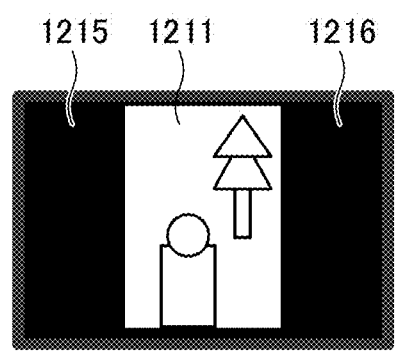

FIGS. 11A to 11C correspond to FIGS. 5A to 5C. A first image 1101 of FIG. 11A corresponds to the first image 501 of FIG. 5A. An action 1103 of FIG. 11A corresponds to the action 503 of FIG. 5A. A partial image 1101a of FIG. 11B corresponds to the partial image 501a of FIG. 5B. A partial focus map 1102a of FIG. 11B corresponds to the partial focus map 502a FIG. 5B. A content 1104 of FIG. 11B corresponds to the content 504 of FIG. 5B. A boundary line 1104a of FIG. 11B corresponds to the boundary line 504a of FIG. 5B. A focus map 1102 of FIG. 11C corresponds to the focus map 502 of FIG. 5C. Operations shown in FIGS. 11A to 11C are the same as the operations described above with reference to FIGS. 5A to 5C, and thus a description thereof will not be given herein.

FIG. 11D corresponds to FIG. 10B, and is a diagram in which an image 1111 obtained by reducing the first image 1101 of a horizontal composition is displayed on the display unit 110 of a vertically long screen. Similarly to FIG. 10B, on the display unit 110, a margin 1115 is displayed above the image 1111, and a margin 1116 is displayed below the image 1111. In the present example, display regions of the margin 1115 and the margin 1116 are effectively utilized. The control unit 101 executes output control for displaying an image 1117 (FIG. 11F) in which the image 1111 obtained by reducing the first image 1101 and a focus map 1112 obtained by reducing the focus map 1102 corresponding to the first image 1101 are lined up on the display unit 110.

As shown in FIG. 11D, a user performs an action 1113 on the operation surface of the operation unit 111 in a state in which the image 1111 is displayed on the display unit 110. The action 1113 is, for example, a vertical swipe operation on the operation surface of the operation unit 111. The control unit 101 executes output control for displaying the image 1117 on the display unit 110 in accordance with the operation unit 111 accepting the action 1113. In the output control performed by the control unit 101, the display on the display unit 110 may be switched from the image 1111 to the image 1117 without interposing display of any other content.

However, in the present example, when the display on the display unit 110 is switched from the image 1111 to the image 1117, display of a content 1114 is interposed therebetween. FIG. 11E is a diagram illustrating the display unit 110 that displays the content 1114. The content 1114 is a content displaying the image 1111, a partial focus map 1112a which is a portion of the focus map 1112, and the margin 1115. The content 1114 is a content in which the display proportion of the margin 1115 in the display unit 110 is gradually decreased and the display proportion of the partial focus map 1112a is gradually increased by moving the display position of the image 1111 from the bottom to the top. Similarly to the display of the content 704, in the display of the content 1114, the display proportions of the margin 1115 and the partial focus map 1112a may also be controlled in accordance with the operation amount of swiping of the swipe operation of the action 1113. In the present example, the display of the content 1114 is inserted during display switching from the image 1111 to the image 1117. In this manner, it is possible to inform a user more intuitively that displays of a captured image, and a captured image and a focus map which are in a correspondence relation to each other are being switched between by performing a vertical operation on the operation unit 111.

During transition from FIG. 11D to FIG. 11E, the partial focus map 1112a may be displayed at the position of the margin 1116 in FIG. 11D, and then the display position of the image 1111 may be moved from the bottom to the top. During transition from FIG. 11D to FIG. 11E, the image 1111 may be pulled down to the position of the margin 1116, and then the display position of the image 1111 may be moved from the bottom to the top.

The control unit 101 executes output control for displaying (FIG. 11D) the image 1111 on the display unit 110, and executes output control for displaying (FIG. 11E) the content 1114 on the display unit 110 in accordance with the operation unit 111 accepting the action 1113. Thereafter, the control unit 101 executes output control for displaying (FIG. 11F) the image 1117 on the display unit 110. If the first image 1101 is an image of a horizontal composition, the image 1111 and the focus map 1112 are disposed vertically side by side when the display unit 110 is set to a vertically long screen, so that the image and the focus map can be laid in the display regions with no waste. In addition, if the display unit 110 is set to a vertically long screen in the state of FIG. 11C, the control unit 101 performs output control for switching the display on the display unit 110 to display of FIG. 11F in accordance with the posture of the display unit 110 acquired by the posture acquisition unit 109 being changed in the direction of the vertically long screen. In addition, if the display unit 110 is set to a horizontally long screen in the state of FIG. 11F, the control unit 101 performs output control for switching the display on the display unit 110 to display of FIG. 11C in accordance with the posture of the display unit 110 acquired by the posture acquisition unit 109 being changed in the direction of the horizontally long screen. In addition, if the display unit 110 is set to a vertically long screen in the state of FIG. 11A, the control unit 101 may cause the posture acquisition unit 109 to acquire a change of this posture, and may perform output control for switching the display on the display unit 110 to display of FIG. 11F in accordance therewith. According to the present example, it is possible to effectively utilize the area of the display region of the display unit 110 by switching an image and focus map display method in accordance with the posture of the display unit 110 in this manner.

A case where an image is a horizontal composition in FIGS. 10A, 10B and 11A to FIG. 11F has been described, whereas a case where an image is a vertical composition is shown in FIGS. 12A, 12B and 13A to 13F.

FIG. 12A is a diagram in which, when the display unit 110 is set in the direction of a vertically long screen, a first image 1201 which is an image of a vertical composition is displayed on the display unit 110. In this case, the control unit 101 causes the posture acquisition unit 109 to continuously acquire the posture of the display unit 110. The control unit 101 performs output control for switching the display on the display unit 110 from display of FIG. 12A to display of FIG. 12B in accordance with the posture of the display unit 110 acquired by the posture acquisition unit 109 being changed from the direction of a vertically long screen to the direction of a horizontally long screen. FIG. 12B is a diagram in which, when the display unit 110 is set in the direction of a horizontally long screen, an image 1211 which is an image of a vertical composition is displayed on the display unit 110. The image 1211 is an image obtained by reducing the first image 1201. The vertical length of the image 1211 is equal to or less than the vertical length of a display region when the display unit 110 is set to a horizontally long screen. On the display screen of the display unit 110, a margin 1215 is disposed at the left portion of the image 1211, and a margin 1216 is disposed at the right portion of the image 1211. When the display unit 110 shows the display of FIG. 12B, the control unit 101 performs output control for switching the display on the display unit 110 to the display of FIG. 12A in accordance with the posture of the display unit 110 acquired by the posture acquisition unit 109 being changed in the direction of a vertically long screen.

Figure 13A:
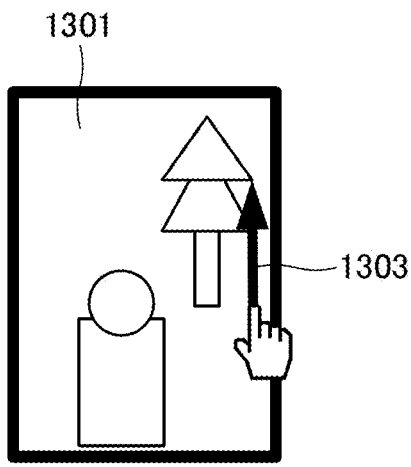
FIGS. 13A to 13F are diagrams illustrating a method of changing an image and focus map display method in accordance with the posture of the display unit in a vertical composition image according to Example 2 of the present invention.

Next, a focus map display function will be described with reference to FIGS. 13A, 13B, 13C, 13D, 13E and FIG. 13F. FIGS. 13A to 13C correspond to FIGS. 7A to 7C. A first image 1301 of FIG. 13A corresponds to the first image 701 of FIG. 7A. An action 1303 of FIG. 13A corresponds to the action 703 of FIG. 7A. A partial image 1301a of FIG. 13B corresponds to the partial image 701a of FIG. 7B. A partial focus map 1302a of FIG. 13B corresponds to the partial focus map 702a of FIG. 7B. A content 1304 of FIG. 13B corresponds to the content 704 of FIG. 7B. A boundary line 1304a of FIG. 13B corresponds to the boundary line 704a of FIG. 7B. A focus map 1302 of FIG. 13C corresponds to the focus map 702 of FIG. 7C. Operations shown in FIGS. 13A to 13C are the same as the operations described above with reference to FIGS. 7A to 7C, and thus a description thereof will not be given herein.

Figure 13D:
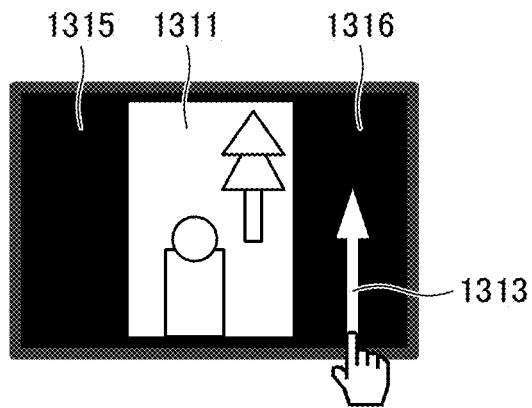
Figure 13B:
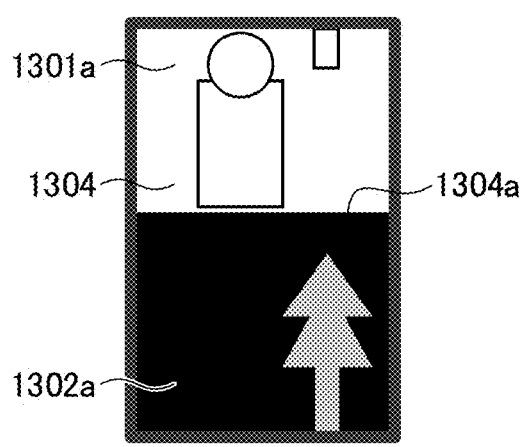

FIG. 13D corresponds to FIG. 12B, and is a diagram in which an image 1311 obtained by reducing the first image 1301 of a vertical composition is displayed on the display unit 110 of a horizontally long screen. Similarly to FIG. 12B, on the display unit 110, a margin 1315 is displayed at the left portion of the image 1311, and a margin 1316 is displayed at the right portion of the image 1311. The control unit 101 executes output control for displaying an image 1317 (FIG. 13F) in which the image 1311 obtained by reducing the first image 1301 and a focus map 1312 obtained by reducing the focus map 1302 corresponding to the first image 1301 are lined up on the display unit 110.

As shown in FIG. 13D, a user performs an action 1313 on operation surface of the operation unit 111 in a state in which the image 1311 is displayed on the display unit 110. The action 1313 is, for example, a vertical swipe operation on the operation surface of the operation unit 111. The control unit 101 executes output control for displaying the image 1317 on the display unit 110 in accordance with the operation unit 111 accepting the action 1313. In the output control performed by the control unit 101, the display on the display unit 110 may be switched from the image 1311 to the image 1317 without interposing display of any other content.

Figure 13E:
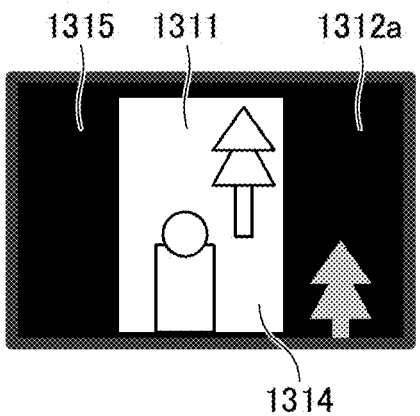
Figure 13C:
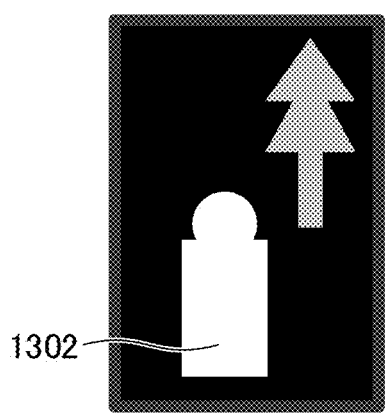

However, in the present example, when the display on the display unit 110 is switched from the image 1311 to the image 1317, display of a content 1314 is interposed between. FIG. 13E is a diagram illustrating the display unit 110 that displays the content 1314. The content 1314 is a content displaying the image 1311, a partial focus map 1312a which is a portion of the focus map 1312, and the margin 1315. The content 1314 is a content in which the display proportion of the margin 1315 in the display unit 110 is gradually decreased and the display proportion of the partial focus map 1312a is gradually increased by moving the display position of the image 1311 from right to left. In the display of the content 1314, the display proportions of the margin 1315 and the partial focus map 1312a may be controlled in accordance with the operation amount of swiping of the swipe operation of the action 1313. In the present example, the display of the content 1314 is inserted during display switching from the image 1311 to the image 1317. In this manner, it is possible to inform a user more intuitively that displays of a captured image, and a captured image and a focus map which are in a correspondence relation to each other are being switched between by performing a vertical operation on the operation unit 111.

During transition from FIG. 13D to FIG. 13E, the partial focus map 1312a may be displayed at the position of the margin 1316 in FIG. 13D, and then the display position of the image 1311 may be moved from right to left. During transition from FIG. 13D to FIG. 13E, the image 1311 may right justify to the position of the margin 1316, and then the display position of the image 1311 may be moved from right to left.

The control unit 101 executes output control for displaying (FIG. 13D) the image 1311 on the display unit 110, and executes output control for displaying (FIG. 13E) the content 1314 on the display unit 110 in accordance with the operation unit 111 accepting the action 1313. Thereafter, the control unit 101 executes output control for displaying (FIG. 13F) the image 1317 on the display unit 110. If the first image 1301 is an image of a vertical composition, the image 1311 and the focus map 1312 are disposed horizontally side by side when the display unit 110 is set to a horizontally long screen, so that the image and the focus map can be laid in the display regions with no waste. In addition, if the display unit 110 is set to a horizontally long screen in the state of FIG. 13C, the control unit 101 performs output control for switching the display on the display unit 110 to display of FIG. 13F in accordance with the posture of the display unit 110 acquired by the posture acquisition unit 109 being changed in the direction of the horizontally long screen. In addition, if the display unit 110 is set to a vertically long screen in the state of FIG. 13F, the control unit 101 performs output control for switching the display on the display unit 110 to display of FIG. 13C in accordance with the posture of the display unit 110 acquired by the posture acquisition unit 109 being changed in the direction of the vertically long screen. In addition, if the display unit 110 is set to a horizontally long screen in the state of FIG. 13A, the control unit 101 may cause the posture acquisition unit 109 to acquire a change of this posture, and may perform output control for switching the display on the display unit 110 to display of FIG. 13F in accordance therewith. According to the present example, it is possible to effectively utilize the area of the display region of the display unit 110 by switching an image and focus map display method in accordance with the posture of the display unit 110 in this manner.

The control unit 101 executes an image reproduction process (a process of FIGS. 8 and 9) of displaying an image on the display unit 110 by accepting an operation of a user who gives an instruction for the execution of the image reproduction process. Hereinafter, a description will be given with reference to the flow charts of FIGS. 8 and 9. First, the control unit 101 executes output control for displaying (FIGS. 10A, 11A, 12A, and 13A) a first image according to an operation of a user who gives an instruction for the execution of the image reproduction process on the display unit 110 (step S801).

Subsequently, the control unit 101 determines whether the posture of the display unit 110 acquired by the posture acquisition unit 109 has been changed (step S802). If the posture of the display unit 110 has been changed (step S802: Yes), the control unit 101 advances the process to step S901 of FIG. 9. If the posture of the display unit 110 is not changed (step S802: No), the control unit 101 advances the process to step S804.

In step S804, the control unit 101 determines whether the operation unit 111 has accepted the first action. If the operation unit 111 has accepted the first action (step S804: Yes), the control unit 101 executes output control for displaying the second image which is an image subsequent to the first image on the display unit 110 (step S805). The control unit 101 terminates the image reproduction process (the process of FIGS. 8 and 9) by accepting an operation of a user who gives an instruction for the termination of the image reproduction process (step S808: Yes). The control unit 101 returns to step S802 and repeats processing according to a user's operation until reproduction is terminated in step S808 (step S808: No).

If the operation unit 111 is not accept the first action (step S804: No), the control unit 101 determines whether the operation unit 111 has accepted the second action (the action 1103 or the action 1303) (step S806). If the operation unit 111 has accepted the second action (step S806: Yes), the process proceeds to step S807. The control unit 101 executes output control for displaying (FIGS. 11B, 11C, 13B, and 13C) a focus map corresponding to the first image on the display unit 110 (step S807). The control unit 101 terminates the image reproduction process (the process of FIGS. 8 and 9) by accepting an operation of a user who gives an instruction for the termination of the image reproduction process (step S808: Yes). The control unit 101 returns to step S802 and repeats processing according to a user's operation until reproduction is terminated in step S808 (step S808: No).

In step S802, if the posture of the display unit 110 has been changed (step S802: Yes), the control unit 101 advances the process to step S901 of FIG. 9. In step S901, the control unit 101 executes output control for displaying (FIGS. 10B, 11D, 12B, and 13D) an image obtained by reducing the first image on the display unit 110.

Subsequently, the control unit 101 determines whether the posture of the display unit 110 acquired by the posture acquisition unit 109 has been changed (step S902). If the posture of the display unit 110 has been changed (step S902: Yes), the control unit 101 advances the process to step S803 of FIG. 8. In step S803 of FIG. 8, the control unit 101 executes output control for displaying (FIGS. 10A, 11A, 12A, and 13A) the first image which is not reduced on the display unit 110. Thereafter, the control unit 101 executes the processes of step S804 and the subsequent steps described above.

In step S902 of FIG. 9, if the posture of the display unit 110 is not changed (step S902: No), the control unit 101 advances the process to step S903 of FIG. 9. In step S903, the control unit 101 determines whether the operation unit 111 has accepted the first action. If the operation unit 111 has accepted the first action (step S903: Yes), the control unit 101 executes output control for displaying the second image which is an image subsequent to the first image on the display unit 110 (step S904). The control unit 101 terminates the image reproduction process (the process of FIGS. 8 and 9) by accepting an operation of a user who gives an instruction for the termination of the image reproduction process (step S907: Yes). The control unit 101 returns to step S902 and repeats processing according to a user's operation until reproduction is terminated in step S907 (step S907: No).

If the operation unit 111 is not accept the first action (step S903: No), the control unit 101 determines whether the operation unit 111 has accepted the second action (the action 1113 or the action 1313) (step S905). If the operation unit 111 has accepted the second action (step S905: Yes), the control unit 101 executes output control for displaying (FIGS. 11F and 13F) an image and a focus map on the display unit 110 (step S906). The image and the focus map which are displayed in step S906 are images in which an image obtained by reducing the first image and a focus map obtained by reducing the focus map corresponding to the first image are lined up. The control unit 101 terminates the image reproduction process (the process of FIGS. 8 and 9) by accepting an operation of a user who gives an instruction for the termination of the image reproduction process (step S907: Yes). The control unit 101 returns to step S902 and repeats processing according to a user's operation until reproduction is terminated in step S907 (step S907: No).

Example 3

Hereinafter, Example 3 of the present invention will be described in detail with reference to the accompanying drawings. Meanwhile, in the present example to be described below, a digital camera which is an example of the image processing device will also be described by way of example. The functional configuration of a digital camera according to Example 3 is the same as that in Example 1 shown in FIG. 1, and thus herein, a description will be given with reference to FIG. 1. In the present example, an example of output control in a case where an action equivalent to image feeding is further brought about when the control unit 101 causes the display unit 110 to display a focus map corresponding to the first image according to, for example, Example 1 will be described. In the present example, in this case, output control for performing image feeding to the next captured image is executed. In the present example, if focus maps (evaluation values) of a plurality of captured images are sequentially checked while confirming them, images can be first confirmed. Thereby, it is possible to omit work of uselessly confirming even the evaluation values of images in which the facial expression, posture or the like of a subject is not so good and the evaluations thereof are low for reasons other than a focus (an evaluation value).

Figure 14A:
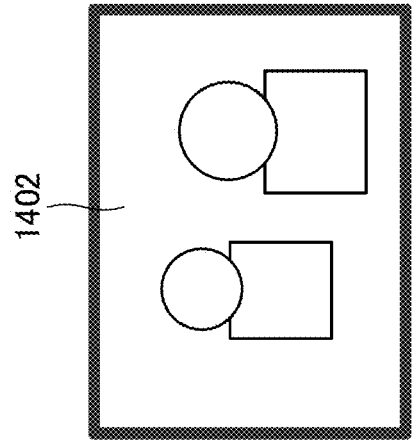
FIGS. 14A to 14C are diagrams illustrating a method of displaying the next image from a focus map according to Example 3 of the present invention.

FIG. 14A corresponds to FIG. 5C, and displays a focus map 1401 corresponding to a first image on the display unit 110. The focus map 1401 of FIG. 14A corresponds to the focus map 502 of FIG. 5C. An action 1403 of FIG. 14A corresponds to the action 403 FIG. 4A. In the present example, a process in a case where the action 1403 as a first action is accepted when the focus map 1401 is displayed on the display unit 110 in accordance with the operation of Example 1 will be described.

Figure 14B:
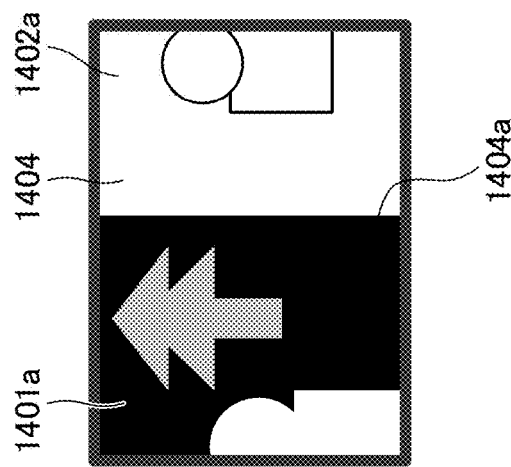
Figure 14C:
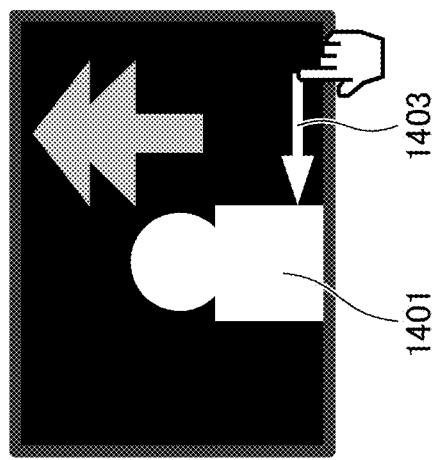

As shown in FIG. 14A, a user performs the action 1403 on the operation surface of the operation unit 111 in a state in which the focus map 1401 is displayed on the display unit 110. The control unit 101 executes output control for displaying a second image 1402 on the display unit 110 in accordance with the operation unit 111 accepting the action 1403. In the output control performed by the control unit 101, the display on the display unit 110 may be switched from the focus map 1401 to the second image 1402 without interposing display of any other content. FIG. 14C is a diagram in which the second image 1402 is displayed on the display unit 110.

However, in the present example, when the display on the display unit 110 is switched from the focus map 1401 to the second image 1402, display of a content 1404 is interposed between. FIG. 14B is a diagram illustrating the display unit 110 that displays the content 1404. The content 1404 is a content displaying a partial focus map 1401a which is a portion of the focus map 1401 and a partial image 1402a which is a portion of the second image 1402. In addition, the content 1404 is a content displaying a boundary line 1404a indicating a boundary between the partial focus map 1401a and the partial image 1402a. The boundary line 1404a is a line that extends in a vertical direction, and the partial focus map 1401a is displayed on its left side, and the partial image 1402a is displayed on the right side. The content 1404 is a content in which the display proportion of the partial focus map 1401a in the display unit 110 is gradually decreased and the display proportion of the partial image 1402a is gradually increased by moving the display position of the boundary line 1404a from right to left. In the display of the content 1404, the display proportions of the partial focus map 1401a and the partial image 1402a may be controlled in accordance with the operation amount of swiping of the swipe operation of the action 1403. In this manner, in the present example, the display of the content 1404 is inserted during display switching from a focus map to the next image. In this manner, it is possible to inform a user more intuitively that images which are displayed are being switched by performing a horizontal operation on the operation unit 111.

The control unit 101 executes output control for displaying (FIG. 14A) the focus map 1401 on the display unit 110, and executes output control for displaying (FIG. 14B) the content 1404 on the display unit 110 in accordance with the operation unit 111 accepting the action 1403. Thereafter, the control unit 101 executes output control for displaying (FIG. 14C) the second image 1402 on the display unit 110. Thereby, a user can first confirm the second image by performing image feeding when the user confirms a focus map corresponding to the first image.

Example 4

Hereinafter, Example 4 of the present invention will be described in detail with reference to the accompanying drawings. Meanwhile, in the present example to be described below, a digital camera which is an example of the image processing device will also be described by way of example. The functional configuration of a digital camera according to Example 4 is the same as that in Example 1 shown in FIG. 1, and thus herein, a description will be given with reference to FIG. 1. In the present example, an example of output control in a case where an action corresponding to image feeding is further performed when the control unit 101 causes the display unit 110 to display a focus map corresponding to the first image according to, for example, Example 1 will be described. In the present example, in this case, output control in which objects to be displayed are sent to a focus map of the next captured image is executed. In the present example, for example, in a plurality of images obtained by performing multiple image capture on substantially the same subject using continuous shooting or the like, direct display can be sent between focus maps in specifying images having a good focus state, and thus it is possible to specify an image having a high focus evaluation more quickly.

Figure 15C:
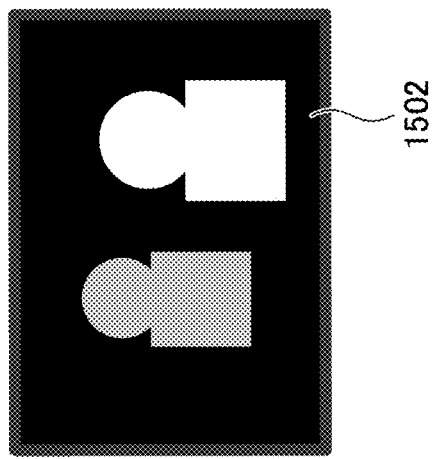
FIGS. 15A to 15C are diagrams illustrating a method of displaying the next focus map from a focus map according to Example 4 of the present invention.
Figure 15B:
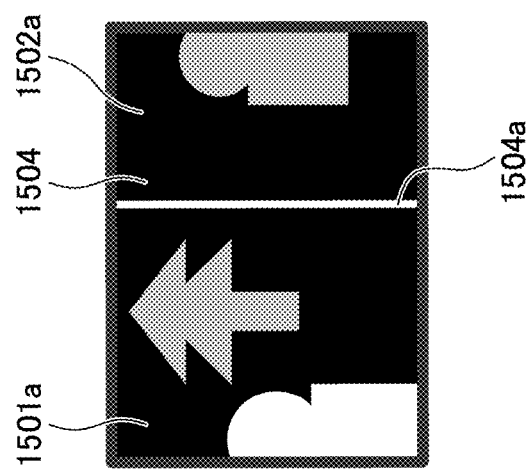
Figure 15A:
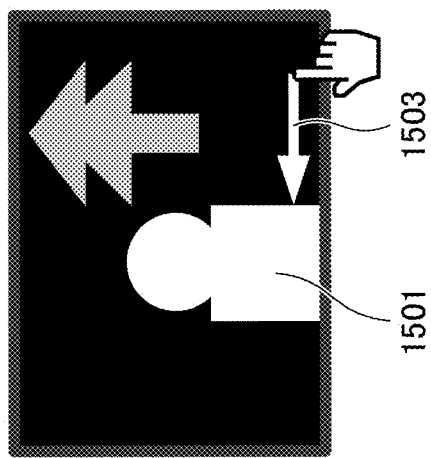

FIG. 15A corresponds to FIG. 5C, and displays a focus map 1501 corresponding to a first image on the display unit 110. The focus map 1501 of FIG. 15A corresponds to the focus map 502 of FIG. 5C. An action 1503 of FIG. 15A corresponds to the action 403 of FIG. 4A. In the present example, a process in a case where the action 1503 as a first action is accepted when the focus map 1501 is displayed on the display unit 110 in accordance with the operation of Example 1 will be described.

As shown in FIG. 15A, a user performs the action 1503 on the operation surface of the operation unit 111 in a state in which the focus map 1501 is displayed on the display unit 110. The control unit 101 executes output control for displaying a focus map 1502 corresponding to a second image on the display unit 110 in accordance with the operation unit 111 accepting the action 1503. In the output control performed by the control unit 101, the display on the display unit 110 may be switched from the focus map 1501 to the focus map 1502 without interposing display of any other content. FIG. 15C is a diagram in which the focus map 1502 is displayed on the display unit 110.

However, in the present example, when the display on the display unit 110 is switched from the focus map 1501 to the focus map 1502, display of a content 1504 is interposed between. FIG. 15B is a diagram illustrating the display unit 110 that displays the content 1504. The content 1504 is a content displaying a partial focus map 1501a which is a portion of the focus map 1501 and a partial focus map 1502a which is a portion of the focus map 1502. In addition, the content 1504 is a content displaying a boundary line 1504a indicating a boundary between the partial focus map 1501a and the partial focus map 1502a. The boundary line 1504a is a line that extends in a vertical direction, and the partial focus map 1501a is displayed on its left, and the partial focus map 1502a is displayed on its right side. The content 1504 is a content in which the display proportion of the partial focus map 1501a in the display unit 110 is gradually decreased and the display proportion of the partial focus map 1502a is gradually increased by moving the display position of the boundary line 1504a from right to left. In the display of the content 1504, the display proportions of the partial focus map 1501a and the partial focus map 1502a may be controlled in accordance with the operation amount of swiping of the swipe operation of the action 1503. In this manner, in the present example, the display of the content 1504 is inserted during display switching from a focus map to the next focus map. In this manner, it is possible to inform a user more intuitively that focus maps which are displayed are being switched by performing a horizontal operation on the operation unit 111.

The control unit 101 executes output control for displaying (FIG. 15A) the focus map 1501 on the display unit 110, and executes output control for displaying (FIG. 15B) the content 1504 on the display unit 110 in accordance with the operation unit 111 accepting the action 1503. Thereafter, the control unit 101 executes output control for displaying (FIG. 15C) the focus map 1502 on the display unit 110. Thereby, a user can continue to confirm a focus map corresponding to the second image when the user confirms a focus map corresponding to the first image.

Meanwhile, if the operation unit 111 accepts the first action and then accepts the first action again before an elapse of a predetermined time, the control unit 101 may execute output control for displaying a focus map corresponding to the second image shown in FIG. 15C. That is, if the operation unit 111 accepts the next first action before an elapse of a predetermined time from the previous first action, the control unit 101 executes output control for displaying a focus map corresponding to the second image.

In addition, if the operation unit 111 accepts the first action and then accepts the first action again after an elapse of a predetermined time, the control unit 101 may execute output control for displaying the second image shown in FIG. 14C. That is, if the operation unit 111 accepts the next first action after an elapse of a predetermined time from the previous first action, the control unit 101 executes output control for displaying the second image.

In this manner, if a user wants to confirm only focus information, the user can confirm a focus map immediately by performing the first action successively. In addition, the next image is displayed by the first action after the user confirms a focus map for a long time, so that the user has a tendency to remember what scene the next image was.

In addition, in the control unit 101, if the action 1503 as the first action is accepted when the focus map 1501 is displayed on the display unit 110, a case in which a focus map corresponding to the next second image is not generated is also considered. In this case, control may be performed so as to generate a focus map corresponding to the second image in the image processing unit 107 in accordance with the acceptance of the action 1503 and then display a focus map generated in the display unit 110. Alternatively, the control unit 101 may perform display, indicating that a focus map corresponding to the second image is not present, such as blackout display of one surface of a screen in accordance with the acceptance of the action 1503. Alternatively, the control unit 101 may execute output control so as to switch to display of the second image similarly to Example 3 in accordance with the acceptance of the action 1503.

Example 5

Hereinafter, Example 5 of the present invention will be described in detail with reference to the accompanying drawings. Meanwhile, in the present example to be described below, a digital camera which is an example of the image processing device will also be described by way of example. The functional configuration of a digital camera according to Example 5 is the same as that in Example 1 shown in FIG. 1, and thus herein, a description will be given with reference to FIG. 1. In the present example, if continuous shot images are reproduced, the control unit 101 makes processes different when images belonging to the same continuous shooting group are reproduced and when images belonging to a different continuous shooting group are reproduced. Meanwhile, the images belonging to the same continuous shooting group are, for example, continuous shot images obtained by the same release action. The images belonging to a different continuous shooting group are, for example, images obtained by a different release action. The control unit 101 causes the RAM 103 to store continuous shooting group information indicating which continuous shooting group these respective images belong to together with the images. The control unit 101 can determine which continuous shooting group the respective images belong to by reading out the continuous shooting group information of the RAM 103.

In the present example, a case where a first image belonging to a first continuous shooting group, a second image belonging to the first continuous shooting group, and a third image belonging to a second continuous shooting group are recorded in the recording medium 108 will be described by way of example. When a user confirms a focus map of a first image, the second image to be next displayed through image feeding belongs to the same continuous shooting group as the first image and does not change greatly in its composition, and thus a user has a tendency to confirm the second image by displaying a focus map of the second image through image feeding, which leads to high convenience. When the user confirms the focus map of the second image, the third image to be next displayed through image feeding belongs to a continuous shooting group different from the second image and changes greatly in its composition, and thus the user can first confirm the image by displaying the third image through image feeding, which leads to high convenience.

Figure 16C:
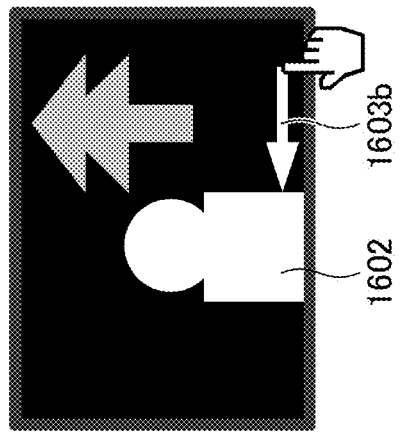
FIGS. 16A to 16E are diagrams illustrating a method of displaying a focus map and an image in accordance with a continuous shooting group according to Example 5 of the present invention.
Figure 16B:
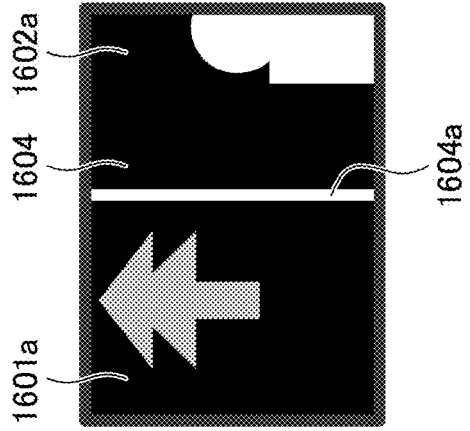
Figure 16A:
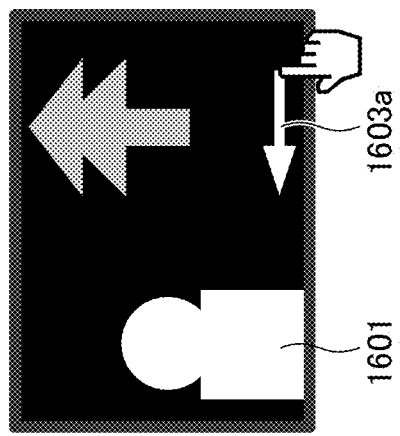

FIG. 16A corresponds to FIG. 5C, and displays a focus map 1601 corresponding to a first image on the display unit 110. The focus map 1601 of FIG. 16A corresponds to the focus map 502 of FIG. 5C. An action 1603a of FIG. 16A corresponds to the action 403 of FIG. 4A. In the present example, first, a process in a case where the action 1603a as the first action is accepted when the focus map 1601 is displayed on the display unit 110 will be described.

As shown in FIG. 16A, a user performs the action 1603a on the operation surface of the operation unit 111 in a state in which the focus map 1601 is displayed on the display unit 110. The control unit 101 determines whether an image to be displayed next to the first image through image feeding belongs to the same continuous shooting group as the first image. Here, the image to be displayed next to the first image through image feeding is a second image, and this second image belongs to the same continuous shooting group as the first image. Therefore, the control unit 101 executes output control for displaying a focus map 1602 corresponding to the second image on the display unit 110 in accordance with the operation unit 111 accepting the action 1603a. When the display on the display unit 110 is switched from the focus map 1601 to the focus map 1602, the control unit 101 may interpose display of a content 1604 of FIG. 16B similarly to FIG. 15B. The content 1604 of FIG. 16B corresponds to the content 1504 of FIG. 15B. A partial focus map 1601a of FIG. 16B corresponds to the partial focus map 1501a of FIG. 15B. A partial focus map 1602a of FIG. 16B corresponds to the partial focus map 1502a of FIG. 15B. A boundary line 1604a of FIG. 16B corresponds to the boundary line 1504a of FIG. 15B.

The control unit 101 executes output control for displaying (FIG. 16A) the focus map 1601 on the display unit 110, and executes output control for displaying (FIG. 16B) the content 1604 on the display unit 110 in accordance with the operation unit 111 accepting the action 1603a. Thereafter, the control unit 101 executes output control for displaying (FIG. 16C) the focus map 1602 on the display unit 110. Thereby, a user can continue to confirm a focus map corresponding to the second image which is an image of the same continuous shooting group when the user confirms a focus map corresponding to the first image.

Figure 16E:
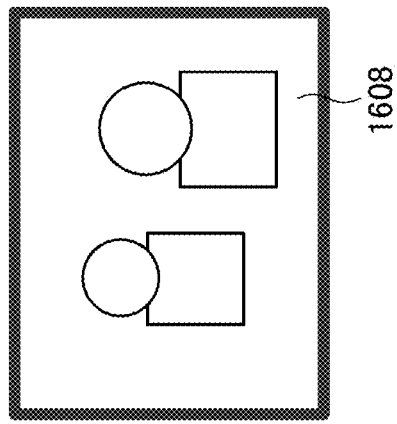
Figure 16D:
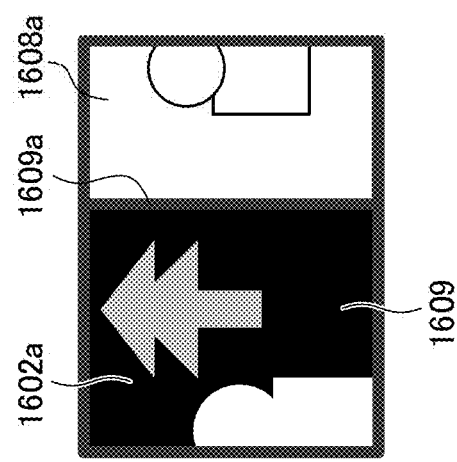

An action 1603b of FIG. 16C corresponds to the action 403 of FIG. 4A. Meanwhile, the action 1603b is the same action as the action 1603a. As shown in FIG. 16C, a user performs the action 1603b on the operation surface of the operation unit 111 in a state in which the focus map 1602 is displayed on the display unit 110. The control unit 101 determines whether an image to be displayed next to the second image through image feeding belongs to the same continuous shooting group as the second image. Here, the image to be displayed next to the second image through image feeding is a third image, and this third image belongs to a continuous shooting group different from the second image. Therefore, the control unit 101 executes output control for displaying a third image 1608 on the display unit 110 in accordance with the operation unit 111 accepting the action 1603b. When the display on the display unit 110 is switched from the focus map 1602 to the third image 1608, the control unit 101 may interpose display of a content 1609 of FIG. 16D similarly to FIG. 14B. The content 1609 of FIG. 16D corresponds to the content 1404 of FIG. 14B. The partial focus map 1602a of FIG. 16D corresponds to the partial focus map 1401a of FIG. 14B. A partial image 1608a of FIG. 16D corresponds to the partial image 1402a of FIG. 14B. A boundary line 1609a of FIG. 16D corresponds to the boundary line 1404a of FIG. 14B.

The control unit 101 executes output control for displaying (FIG. 16C) the focus map 1602 on the display unit 110, and executes output control for displaying (FIG. 16D) the content 1609 on the display unit 110 in accordance with the operation unit 111 accepting the action 1603b. Thereafter, the control unit 101 executes output control for displaying (FIG. 16E) the third image 1608 on the display unit 110. Thereby, a user can first confirm the third image rather than a focus map corresponding to the third image with respect to the third image of a different continuous shooting group when the user confirms a focus map corresponding to the second image.

Figure 11F:
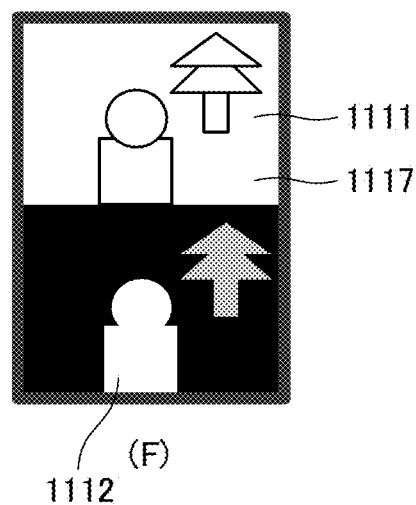
Figure 13F:
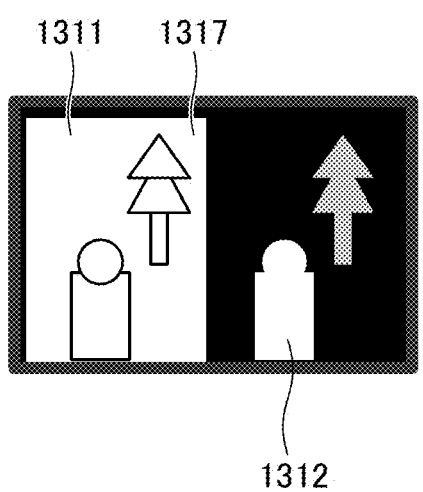

Meanwhile, in the present example, a description has been made in a state in which only the focus map is displayed on the display unit 110 as shown in FIGS. 11C and 13C. However, it is a matter of course that the present invention can realize a similar function even in a state in which the image and the focus map which are reduced are simultaneously displayed on the display unit 110 as shown in FIG. 11F and FIG. 13F. For example, if image feeding is performed by the first action in a state in which an image and a focus map are displayed on the display unit 110, the control unit 101 may execute output control for displaying the next image and a focus map corresponding to the next image.

OTHER EMBODIMENTS

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-117755, filed Jun. 25, 2019, which is hereby incorporated by reference herein in its entirety.

What is claimed is:

1. An information processing device comprising:
at least one processor and a memory holding a program which makes the at least one processor function as a plurality of units comprising:
(1) an output unit configured to output an image and distribution information of evaluation values corresponding to a plurality of regions of the image; and
(2) a control unit configured to execute output control such that (a) the output unit outputs an image if the control unit is notified of information corresponding to a first action, and (b) the output unit outputs the distribution information of the evaluation if the control unit is notified of information corresponding to a second action different from the first action.

2. The information processing device according to claim 1, wherein the control unit executes the output control so that the image and the distribution information of the evaluation values which are output by the output unit are displayed by a display unit.

3. The information processing device according to claim 1, wherein the control unit executes the output control so that the distribution information of the evaluation values in which each evaluation value is visualized is displayed by a display unit at a position of a region of the image to which each evaluation value corresponds.

4. The information processing device according to claim 1, wherein when the output unit outputs the distribution information of the evaluation values, the control unit executes the output control such that the output unit outputs the image if the control unit is notified of information corresponding to the first action.

5. The information processing device according to claim 1, wherein when the output unit outputs the distribution information of the evaluation values, the control unit executes the output control such that the output unit outputs the distribution information of the evaluation values if the control unit is notified of information corresponding to the first action.

6. The information processing device according to claim 1, wherein when the output unit outputs the distribution information of the evaluation values, the control unit executes the output control such that:
(a) the output unit outputs the distribution information of the evaluation if the control unit is notified of information corresponding to the first action before an elapse of a predetermined time from the previous notification of information corresponding to the first action; and
(b) the output unit outputs the image if the control unit is notified of information corresponding to the first action after the elapse of a predetermined time from the previous notification of information corresponding to the first action.

7. The information processing device according to claim 1, wherein, when the output unit outputs the distribution information of the evaluation values, the control unit executes the output control such that:
- (a) the output unit outputs the distribution information of the evaluation values corresponding to a second image if the second image is an image belonging to the same continuous shooting group as a first image and the control unit is notified of information corresponding to the first action; and
- (b) the output unit outputs the second image if the second image is an image belonging to a continuous shooting group different from the first image and the control unit is notified of information corresponding to the first action.

8. The information processing device according to claim 1, wherein the distribution information of the evaluation values includes distribution information of focus information.

9. The information processing device according to claim 1, wherein the distribution information of the evaluation values includes at least any one of (a) distribution information of a degree of blurring, (b) distribution information of a degree of halation or blackout, (c) distribution information of distance information, (d) information of a normal direction distribution, or (e) probability distribution information of semantic region division.

10. The information processing device according to claim 1, wherein the control unit accepts an operation input from a touch panel, and
wherein the first action and the second action are a swipe operation on the touch panel, or a short-side tap and a long-side tap.

11. The information processing device according to claim 1, wherein the control unit accepts an input from a cross key-shaped or stick-shaped control unit, and
wherein the first action and the second action are a horizontal input and vertical input for the control unit.

12. The information processing device according to claim 1, wherein the control unit accepts an operation input from at least one of a visual line sensor that detects a visual line of a user, a gesture detection unit that detects a gesture of a user, an acceleration sensor, and a mouse.

13. The information processing device according to claim 1, wherein the at least one processor further functions as a posture acquisition unit configured to acquire a posture of the information processing device, and
wherein the control unit executes the output control for making an output of the output unit different in accordance with the posture of the information processing device.

14. The information processing device according to claim 13, wherein the control unit executes the output control for making the output of the output unit different in accordance with vertical or horizontal information of the image.

15. The information processing device according to claim 14, wherein the control unit executes the output control for making the output of the output unit different in accordance with the vertical or horizontal information of the image and the posture of the information processing device.

16. An imaging device comprising:
an imaging sensor configured to acquire an image; and
at least one processor and a memory holding a program which makes the at least one processor function as a plurality of units comprising: (1) an output unit configured to output the image or distribution information of evaluation values corresponding to a plurality of regions of the image; (2) a control unit configured to execute output control such that (a) the output unit outputs an image if the control unit is notified of information corresponding to a first action, and (b) the output unit outputs the distribution information of the evaluation values if the control unit is notified of information corresponding to a second action different from the first action; and (3) a display unit configured to display the image and the distribution information of the evaluation values which is output by the output unit.

17. A non-transitory storage medium on which is stored a computer program for causing a computer of an information processing device to execute a control method, the method comprising:
outputting an image or distribution information of evaluation values corresponding to a plurality of regions of an image; and
executing output control such that (a) the outputting outputs an image if there is notification of information corresponding to a first action, and (b) the outputting outputs the distribution information of the evaluation values if there is notification of information corresponding to a second action different from the first action.

18. The information processing device according to claim 1, wherein the at least one processor further functions as a display unit configured to display the image or the distribution information of the evaluation values which is output by the output unit.

19. The information processing device according to claim 1, further comprising a visual line sensor configured to detect a visual line of a user.

20. The information processing device according to claim 1, wherein the at least one processor further functions as an imaging unit configured to acquire the image.

21. The information processing device according to claim 1, wherein the processor further functions as an imaging unit configured to acquire the image from an imaging sensor, the imaging sensor comprising photoelectric conversion units which photoelectrically convert light having passed through respective different exit pupils of an optical system.

22. The imaging device according to claim 16, wherein the imaging sensor comprises photoelectric conversion units which photoelectrically convert light having passed through respective different exit pupils of an optical system.

* * * * *